United States Patent
Bae et al.

(10) Patent No.: US 12,318,770 B2
(45) Date of Patent: *Jun. 3, 2025

(54) IONIC FUNCTIONALIZATION OF AROMATIC POLYMERS FOR ION EXCHANGE MEMBRANES

(71) Applicant: Rensselaer Polytechnic Institute, Troy, NY (US)

(72) Inventors: Chulsung Bae, Cohoes, NY (US); Eun Joo Park, Troy, NY (US); Sangtaik Noh, Troy, NY (US); Michael Pagels, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/381,149

(22) Filed: Oct. 17, 2023

(65) Prior Publication Data
US 2024/0157353 A1    May 16, 2024

Related U.S. Application Data

(63) Continuation of application No. 17/658,627, filed on Apr. 8, 2022, now Pat. No. 11,826,746, which is a
(Continued)

(51) Int. Cl.
*B01J 39/20*    (2006.01)
*B01J 41/14*    (2006.01)
(Continued)

(52) U.S. Cl.
CPC ............... *B01J 41/14* (2013.01); *B01J 39/20* (2013.01); *C08J 5/2287* (2013.01);
(Continued)

(58) Field of Classification Search
USPC ............................................................ 521/30
See application file for complete search history.

(56) References Cited

U.S. PATENT DOCUMENTS

| | | |
|---|---|---|
| 1,123,196 A | 12/1914 | Kilmer |
| 6,590,067 B2 | 7/2003 | Kerres et al. |

(Continued)

FOREIGN PATENT DOCUMENTS

| | | |
|---|---|---|
| CA | 2396166 A1 | 1/2003 |
| CN | 1312833 A | 9/2001 |

(Continued)

OTHER PUBLICATIONS

Adhikari S et al., "Ionomers for Electrochemical Energy Conversion & Storage Technologies," Polymer, 2020, 123080.
(Continued)

*Primary Examiner* — Fred M Teskin
(74) *Attorney, Agent, or Firm* — Weaver Austin Villeneuve & Sampson LLP

(57) ABSTRACT

The electrochemical energy conversion system of the present disclosure includes an anode, a cathode, and an ion exchange membrane including a polymer having an aromatic polymer chain and an alkylated substrate including an alkyl chain, and at least one ionic group. The alkylated substrate is bound to at least one aromatic group in the polymer chain via Friedel-Crafts alkylation of the at least one aromatic group. The alkylation reaction utilizes a haloalkylated tertiary alcohol or a haloalkylated alkene as a precursor. In the presence of an acid catalyst, a carbocation is generated in the precursor which reacts with the aromatic rings of the polymer chain. The at least one ionic group is then replaced with a desired cationic or anionic group using
(Continued)

a substitution reaction. The membranes exhibit advantageous stability achieved through a simplified and scalable reaction scheme.

14 Claims, 9 Drawing Sheets

Related U.S. Application Data continuation of application No. 16/842,037, filed on Apr. 7, 2020, now abandoned, which is a continuation-in-part of application No. 16/628,879, filed as application No. PCT/US2018/040898 on Jul. 5, 2018, now abandoned.

(60) Provisional application No. 62/652,037, filed on Apr. 3, 2018, provisional application No. 62/652,063, filed on Apr. 3, 2018, provisional application No. 62/647,930, filed on Mar. 26, 2018, provisional application No. 62/529,078, filed on Jul. 6, 2017, provisional application No. 62/832,087, filed on Apr. 10, 2019, provisional application No. 62/830,928, filed on Apr. 8, 2019.

(51) Int. Cl.
C08J 5/22 (2006.01)
H01M 8/1032 (2016.01)
H01M 8/1072 (2016.01)
H01M 8/10 (2016.01)

(52) U.S. Cl.
CPC ....... *H01M 8/1032* (2013.01); *H01M 8/1072* (2013.01); *C08J 2353/00* (2013.01); *H01M 2008/1095* (2013.01)

(56) References Cited

U.S. PATENT DOCUMENTS

| | | | |
|---|---|---|---|
| 7,078,121 B2 | 7/2006 | Kanaoka et al. | |
| 7,615,300 B2 | 11/2009 | Bae | |
| 7,671,157 B2 | 3/2010 | Bae | |
| 7,888,397 B1 | 2/2011 | Hibbs et al. | |
| 8,445,141 B2 | 5/2013 | Kitamura et al. | |
| 8,697,203 B2 | 4/2014 | Koenig | |
| 8,809,483 B1 | 8/2014 | Hibbs | |
| 9,051,431 B2 | 6/2015 | Kim et al. | |
| 9,276,282 B2 | 3/2016 | Zhang et al. | |
| 9,534,097 B2 | 1/2017 | Hibbs | |
| 9,580,541 B1 | 2/2017 | Fujimoto et al. | |
| 9,988,526 B2 | 6/2018 | Rodrigues et al. | |
| 10,053,534 B2 | 8/2018 | Fujimoto | |
| 10,053,535 B2 | 8/2018 | Kim et al. | |
| 10,170,799 B2 | 1/2019 | Ouchi et al. | |
| 10,272,424 B2 | 4/2019 | Bae et al. | |
| 10,290,890 B2 | 5/2019 | Yan et al. | |
| 10,294,325 B2 | 5/2019 | Fujimoto | |
| 10,370,483 B2 | 8/2019 | Kim et al. | |
| 10,435,504 B2 | 10/2019 | Bae et al. | |
| 11,236,196 B2 | 2/2022 | Bae et al. | |
| 11,286,337 B2 | 3/2022 | Bae et al. | |
| 11,621,433 B2 | 4/2023 | Bae et al. | |
| 11,826,746 B2 * | 11/2023 | Bae ..................... | H01M 8/1023 |
| 11,834,550 B2 | 12/2023 | Bae et al. | |
| 11,987,664 B2 | 5/2024 | Bae et al. | |
| 12,027,731 B2 | 7/2024 | Bae et al. | |
| 2002/0061431 A1 | 5/2002 | Koyama et al. | |
| 2002/0062046 A1 | 5/2002 | Swan et al. | |
| 2003/0056669 A1 | 3/2003 | Miller et al. | |
| 2003/0114598 A1 | 6/2003 | Li et al. | |
| 2003/0134936 A1 | 7/2003 | West et al. | |
| 2003/0173547 A1 | 9/2003 | Yamakawa et al. | |
| 2004/0048127 A1 | 3/2004 | Shirai et al. | |
| 2006/0004177 A1 | 1/2006 | Gao et al. | |
| 2006/0135702 A1 | 6/2006 | Wang et al. | |
| 2007/0048579 A1 | 3/2007 | Bae | |
| 2008/0262163 A1 | 10/2008 | Bae | |
| 2009/0004528 A1 | 1/2009 | Fritsch et al. | |
| 2009/0280383 A1 | 11/2009 | Mackinnon et al. | |
| 2010/0041834 A1 | 2/2010 | Bae | |
| 2010/0047657 A1 | 2/2010 | Mackinnon et al. | |
| 2010/0279204 A1 | 11/2010 | Isomura et al. | |
| 2011/0207028 A1 | 8/2011 | Fukuta et al. | |
| 2013/0292252 A1 | 11/2013 | Linder et al. | |
| 2014/0024728 A1 | 1/2014 | Kim et al. | |
| 2014/0227627 A1 | 8/2014 | He et al. | |
| 2014/0275300 A1 | 9/2014 | Kim et al. | |
| 2014/0353241 A1 | 12/2014 | Yin et al. | |
| 2015/0017566 A1 | 1/2015 | Watanabe et al. | |
| 2015/0111128 A1 | 4/2015 | Matsuda et al. | |
| 2017/0114196 A1 | 4/2017 | Häring et al. | |
| 2017/0203289 A1 | 7/2017 | Bae et al. | |
| 2017/0252707 A1 | 9/2017 | Bahar et al. | |
| 2017/0355811 A1 | 12/2017 | Bae et al. | |
| 2018/0251616 A1 | 9/2018 | Bahar et al. | |
| 2019/0308185 A1 | 10/2019 | Bae et al. | |
| 2020/0055980 A1 | 2/2020 | Bae et al. | |
| 2020/0091535 A1 | 3/2020 | Bae et al. | |
| 2020/0094241 A1 | 3/2020 | Bae et al. | |
| 2020/0172659 A1 | 6/2020 | Bae et al. | |
| 2020/0223997 A1 | 7/2020 | Bae et al. | |
| 2020/0238272 A1 | 7/2020 | Bae et al. | |
| 2021/0108067 A1 | 4/2021 | Bae et al. | |
| 2022/0052357 A1 | 2/2022 | Bae et al. | |
| 2022/0127412 A1 | 4/2022 | Bae et al. | |
| 2022/0227921 A1 | 7/2022 | Bae et al. | |
| 2022/0266239 A1 | 8/2022 | Bae et al. | |
| 2023/0096778 A1 | 3/2023 | Bae et al. | |
| 2024/0141097 A1 | 5/2024 | Bae et al. | |

FOREIGN PATENT DOCUMENTS

| | | | |
|---|---|---|---|
| CN | 101578729 A | 11/2009 | |
| CN | 102869448 A | 1/2013 | |
| CN | 103459526 A | 12/2013 | |
| CN | 103694490 A | 4/2014 | |
| CN | 106040318 A | 10/2016 | |
| CN | 106536583 A | 3/2017 | |
| CN | 107112563 A | 8/2017 | |
| CN | 109070022 A | 12/2018 | |
| EP | 0352798 A2 | 1/1990 | |
| EP | 2324529 B1 | 1/2016 | |
| JP | H06188005 A | 7/1994 | |
| JP | 2001002738 A | 1/2001 | |
| JP | 2003203648 A | 7/2003 | |
| JP | 2004131662 A | 4/2004 | |
| JP | 2012049111 A | 3/2012 | |
| JP | 2013505825 A | 2/2013 | |
| JP | 2016032098 A | 3/2016 | |
| JP | 2017531700 A | 10/2017 | |
| JP | 2018502180 A | 1/2018 | |
| JP | 2021523978 A | 9/2021 | |
| KR | 20140064308 A | 5/2014 | |
| KR | 20150060159 A | 6/2015 | |
| WO | WO-2006066505 A1 | 6/2006 | |
| WO | WO-2007079004 A2 | 7/2007 | |
| WO | WO-2012081026 A2 | 6/2012 | |
| WO | WO-2016014636 A1 | 1/2016 | |
| WO | WO 2016/081432 A * | 5/2016 | .......... H01M 8/1039 |
| WO | WO-2017172824 A1 | 10/2017 | |
| WO | WO-2018119020 A1 | 6/2018 | |
| WO | WO-2019010290 A1 | 1/2019 | |
| WO | WO-2019068051 A2 | 4/2019 | |

OTHER PUBLICATIONS

Ayers K, "Benchmarking Advanced Water Splitting Technologies: Best Practices in Materials Characterization," presented at the 2020 U.S. Department of Energy Hydrogen and Fuel Cells Program Annual Merit Review and Peer Evaluation Meeting on May 20,

(56) References Cited

OTHER PUBLICATIONS 2020, accessible at https://www.hydrogen.energy.gov/pdfs/review20/p170_ayers_2020_o.pdf (last accessed Dec. 15, 2020), 21 pages.
Ayers K, "Economic Production of Hydrogen through the Development of Novel, High Efficiency Electrocatalysts for Alkaline Membrane Electrolysis," presented at the 2017 U.S. Department of Energy (DOE) Hydrogen and Fuel Cells Program and Vehicle Technologies Office Annual Merit Review and Peer Evaluation Meeting on Jun. 5-9, 2017 in Washington, D.C., accessible at https://www.hydrogen.energy.gov/pdfs/review17/pd147_ayers_2017_o.pdf (last accessed Dec. 15, 2020), 29 pp.
Bae C, "Channeling Engineering of Hydroxide Ion Exchange Polymers and Reinforced Membranes," presented at the 2019 U.S. Department of Energy (DOE) Hydrogen and Fuel Cells Program Annual Merit Review and Peer Evaluation Meeting on Apr. 29-May 1, 2019 in Crystal City, Virginia, accessible at https://www.hydrogen.energy.gov/pdfs/review19/arpae09_bae_2019_p.pdf (last accessed Dec. 15, 2020), 26 pp.
Bae C, "Cyclic Olefin Copolymer based Alkaline Exchange Polymers and Reinforced Membranes," presented at the 2019 U.S. Department of Energy (DOE) Hydrogen and Fuel Cells Program Annual Merit Review and Peer Evaluation Meeting on Apr. 29-May 1, 2019 in Crystal City, Virginia, accessible at https://www.hydrogen.energy.gov/pdfs/review19/fc307_bae_2019_p.pdf (last accessed Dec. 15, 2020), 13 pp.
Bae C, "Cyclic Olefin Copolymer based Alkaline Exchange Polymers and Reinforced Membranes," presented at the 2020 U.S. Department of Energy Hydrogen and Fuel Cells Program Annual Merit Review and Peer Evaluation Meeting on May 19, 2020, accessible at https://www.hydrogen.energy.gov/pdfs/review20/fc307_bae_2020_o.pdf (last accessed Dec. 15, 2020), 21 pp.
Bae C, "Development of Versatile Polymer Materials for Anion Exchange Membranes in Electrochemical Energy Conversion Technology," ECS Meeting Abstracts, 2020, MA2020-02, 2363 (1 p.).
Bae C et al., "Cyclic Olefin Copolymer-Based Alkaline Exchange Polymers and Reinforced Membranes" in 2019 Annual Progress Report: DOE Hydrogen and Fuel Cells Program, U.S. Department of Energy, Document No. DOE/GO-102020-5257, Apr. 2020, accessible at https://www.hydrogen.energy.gov/pdfs/progress19/fc_fc307_bae_2019.pdf (last accessed Dec. 15, 2020), 5 pp.
Bae C, "Ion Conducting Polymer Electrolyte Membranes for Energy Conversion Technology," presented at the Rensselaer Polytechnic Institute Center for Future Energy Systems (RPI CFES) Symposium on Apr. 10, 2019 in Troy, New York, accessible at https://cfes.rpi.edu/sites/default/files/A7%20Bae.pdf (last accessed Dec. 15, 2020), 19 pp.
Bae C, "New functional polymers for alternative energy applications," presented at University of Nevada, Las Vegas (UNLV) Renewable Energy Symposium on Aug. 20, 2008 in Las Vegas, Nevada, accessible at https://digitalscholarship.unlv.edu/cgi/viewcontent.cgi?article=1023&context=res (last accessed Jan. 16, 2021), 21 pp.
Black SB et al., "FTIR characterization of water-polymer interactions in superacid polymers," The Journal of Physical Chemistry B, 2013, 117 (50), 16266-16274.
BR Office Action dated Aug. 17, 2023, in Application No. BR112021010146-2 with English Translation.
BR Office Action dated Dec. 9, 2022 in Application No. BR1120200219266 with English translation.
Briem M et al., "Comparison of Novel 1, 1-Diphenylethylene Alternating Copolymer and Polystyrene Based Anion Exchange Membranes," ECS Meeting Abstracts, 2020, MA2020-2, 2242 with Presentation (31 pp.).
Brownell LV et al., "Synthesis of polar block grafted syndiotactic polystyrenes via a combination of iridium-catalyzed activation of aromatic C—H bonds and atom transfer radical polymerization," Journal of Polymer Science Part A: Polymer Chemistry, 2009, 47(23), 6655-6667.
CA Office Action dated Jan. 26, 2022, in Application No. CA2968110.
CA Office Action dated Jul. 29, 2022, in Application No. CA2968110.

Cai, M. et al., "Synthesis and Characterization of Poly(ether ketone ether ketone ketone)/Poly(ether ether ketone ketone) Copolymers Containing Naphthalene and Pendant Cyano Groups", Journal of Applied Polymer Science, 2009, vol. 112, pp. 3225-3231.
Chang, J. Y. et al., "Synthesis of a Linear Phenolic Polymer by an Aromatic Electrophilic Substitution Reaction", Macromolecules, 1997, vol. 30, pp. 8075-8077.
Chang Y et al., "Acidity Effect on Proton Conductivity of Hydrocarbon-Based Ionomers," ECS Transactions, 2010, 33 (1), 735.
Chang Y et al., "Aromatic ionomers with highly acidic sulfonate groups: acidity, hydration, and proton conductivity," Macromolecules, 2011, 44 (21), 8458-8469.
Chang Y et al., "Scope and regioselectivity of iridium-catalyzed C—H borylation of aromatic main-chain polymers," Macromolecules, 2013, 46 (5), 1754-1764.
Chang Y et al., "Direct Fluorination of the Carbonyl Group of Benzophenones Using Deoxo-Fluor®: Preparation of Bis (4-Fluorophenyl) Difluoromethane," Organic Syntheses, 2010, 87, 245-252.
Chang Y et al., "Direct nucleophilic fluorination of carbonyl groups of benzophenones and benzils with Deoxofluor," Tetrahedron, 2008, 64 (42), 9837-9842.
Chang Y et al., "Effect of superacidic side chain structures on high conductivity aromatic polymer fuel cell membranes," Macromolecules, 2015, 48(19), 7117-7126.
Chang Y et al., "Partially fluorinated sulfonated poly (ether amide) fuel cell membranes: influence of chemical structure on membrane properties," Polymers 3(1), 222-235.
Chang Y et al., "Poly (Arylene Ether Sulfone) Ionomers with Different Acidity Strengths and Fuel Cell Membrane Properties," ECS Transactions, 2013, 50(2), 1031.
Chang Y et al., "Polymer electrolyte membranes based on poly (arylene ether sulfone) with pendant perfluorosulfonic acid," Polymer Chemistry, 2013, 4(2), 272-281.
Chang Y et al., "Polymer-supported acid catalysis in organic synthesis," Current Organic Synthesis, 2011, 8 (2), 208-236.
Chang Y et al., "Polystyrene Ionomers Functionalized with Partially Fluorinated Short Side-Chain Sulfonic Acid for Fuel Cell Membrane Applications," in Sustainable Membrane Technology for Energy, Water, and Environment, Ismail AF & Matsuura T (eds.), John Wiley & Sons, 2012, pp. 243-249.
Chang Y et al., "Polystyrene-Based Superacidic Ionomers: Synthesis and Proton Exchange Membrane Applications," ECS Transactions, 2011, 41 (1), 1615.
Chang Y et al., "Polystyrene-based superacidic solid acid catalyst: synthesis and its application in biodiesel production," RSC advances, 2014, 4 (88), 47448-47454.
Chen, G. et al., "Cationic fluorinated polymer binders for microbial fuel cell cathodes", DOI: 10.1039/C2RA20705B (Paper) RSC Adv, 2012, vol. 2, pp. 5856-5862.
Chung HT et al., "Effect of organic cations on hydrogen oxidation reaction of carbon supported platinum," Journal of The Electrochemical Society, 2016, 163(14), F1503-F1509.
Clendinning, R. A, et al., "Poly(aryl Ether Ketone) Block and Chain-extended Copolymers. 1. Preparation and Characterization of a New Class of Functional Poly(aryl Ether Ketone) Oligomers", Macromolecules, 1993, vol. 26, 2361-2365.
CN Office Action dated Sep. 5, 2022 in Application No. CN202010532979.2 with English translation.
CN Office Action dated Dec. 1, 2023 in CN Application No. 202180016258.9 with English Translation.
CN Office Action dated Jul. 7, 2023, in application No. CN201980077678 with English translation.
CN Office Action dated Jul. 18, 2024 in CN Application No. 201980041740 with English translation.
CN Office Action dated Jun. 25, 2023, in Application No. CN201980041740.0 with English translation.
CN Office Action dated Mar. 29, 2023, in Application No. CN202010532979.2 with English translation.
CN Office Action dated Oct. 31, 2023 in CN Application No. 201980041740.0, with English Translation.
CN Office Action dated Sep. 1, 2022, in Application No. CN201980041740 with English translation.

(56) References Cited

OTHER PUBLICATIONS

CN Search Report issued on Oct. 29, 2019 in Application No. 201580062578.2.
CN Supplemental Search Report issued on Mar. 25, 2020 in Application No. 201580062578.2.
Colquhoun, H. M, et al., "Superelectrophiles in Aromatic Polymer Chemistry", Macromolecules, 2001, vol. 34, pp. 1122-1124.
Cruz, A.R. et al., "Precision Synthesis of Narrow Polydispersity, Ultrahigh Molecular Weight Linear Aromatic Polymers by $A_2 + B_2$ Nonstoichiometric Step-Selective Polymerization", Macromolecules, 2012, vol. 45, pp. 6774-6780.
Dang, H-S., et al., "Poly(Phenylene Oxide) Functionalized With Quaternary Ammonium Groups via Flexible Alkyl Spacers for High-performance Anion Exchange Membranes," Journal of Materials Chemistry A, Jan. 1, 2015, vol. 3, No. 10, pp. 5280-5284, XP055564621.
Date B et al., "Synthesis and morphology study of SEBS triblock copolymers functionalized with sulfonate and phosphonate groups for proton exchange membrane fuel cells," Macromolecules, 2018, 51(3), 1020-1030.
Diaz, A. M. et al., "A Novel, One-Pot Synthesis of Novel 3F, 5F, and 8F Aromatic Polymers", Macromolecular Rapid Communication, 2007, vol. 28, pp. 183-187.
Einsla ML et al., "Toward improved conductivity of sulfonated aromatic proton exchange membranes at low relative humidity," Chemistry of Materials, 2008, 20, 5636-5642.
EP Partial Supplementary European Search Report dated Dec. 20, 2021, in application No. EP19791619.0.
EP Office Action issued on Mar. 12, 2020, in Application No. 15860054.4.
EP Search report dated Mar. 11, 2022, in Application No. EP19791619.0.
EP Supplemental Search Report and Written Opinion issued on Jun. 15, 2018, in Application No. 15860054.4.
Ex Parte Quayle Action issued on Mar. 5, 2019, in U.S. Appl. No. 15/527,967.
Extended European search report dated Jul. 22, 2022, in Application No. EP19889097.2.
Final Office Action issued on Jun. 3, 2021, in U.S. Appl. No. 16/471,358.
Florin, R. E., "Catalyst Specificity in Friedel-Crafts Copolymerization", Journal of the American Chemical Society, 1951, vol. 73, No. 9, pp. 4468-4470.
Fox, C. J, et al., "The Synthesis of Polymers via Acylation of Triphenylamine", Macromolecular Chemistry and Physics, Mar. 15, 1965, vol. 82, No. 1, 53-59.
Fritz, A. et al., "Synthesis of Aryleneisopropylidene Polymers", Journal of Polymer Science, 1972, vol. 10, pp. 2365-2378.
George, J. et al., "Inhibition of Friedel-Crafts Polymerization1. I. The Mechanism of Inhibition", Journal of the American Chemical Society, 1950, vol. 72, No. 9, pp. 3891-3896.
George, J. et al., "Inhibition of Friedel-Crafts Polymerization[1]. II. Factors Affecting Inhibitor Power", Journal of the American Chemical Society, 1950, vol. 72, No. 9, pp. 3896-3901.
Goseki, R et al., "Synthesis of a Well-defined Alternating Copolymer of 1,1-diphenylethylene and Tert-butyldimethyl-silyloxymethyl Substituted Styrene by Anionic Copolymerization: Toward Tailored Graft Copolymers With Controlled Side-chain Densities", Polymer Chemistry, 2019, vol. 10, pp. 6413-6422.
Gottesfeld S et al., "Anion exchange membrane fuel cells: Current status and remaining challenges," Journal of Power Sources, 2018, 375, 170-184.
Gottesfeld S et al., "Direct ammonia fuel cells (DAFCs) for transport application," presented at the 2019 U.S. Department of Energy (DOE) Hydrogen and Fuel Cells Program Annual Merit Review and Peer Evaluation Meeting on Apr. 29-May 1, 2019 in Crystal City, Virginia, accessible at https://www.hydrogen.energy.gov/pdfs/review19/arpae09_bae_2019_p.pdf (last accessed Dec. 15, 2020), 26 pp.
Guzman-Guiterrez, et al., "Dramatic Enhancement of Superacid-Catalyzed Polyhydroxyalkylation Reactions," Macromolecules, 2011, 44, pp. 194-202.
Guzman-Gutierrez, M. T. et al., "Structure-properties Relationship for the Gas Transport Properties of New Fluoro-containing Aromatic Polymers", Journal of Membrane Science, 2011, vol. 385-386, pp. 277-284.
Guzman-Gutierrez, M. T. et al., "Synthesis and Gas Transport Properties of New Aromatic 3F Polymers", Journal of Membrane Science, 2008, vol. 323, pp. 379-385.
Han KW et al., "Molecular dynamics simulation study of a polysulfone-based anion exchange membrane in comparison with the proton exchange membrane," The Journal of Physical Chemistry C, 2014, 118(24), 12577-12587.
Hao, J., et al., "Crosslinked High-performance Anion Exchange Membranes Based on Poly(Styrene-b-(Ethylene-co-butylene)-b-styrene)," Journal of Membrane Science, Jan. 24, 2018, vol. 551, pp. 66-75, XP055647135.
Haque, M.A. et al., "Acid Doped Polybenzimidazoles Based Membrane Electrode Assembly for High Temperature Proton Exchange Membrane Fuel Cell: A Review", International Journal of Hydrogen Energy, 2017, vol. 42, No. 14, pp. 9156-9179.
He, R. et al., "Proton Conductivity of Phosphoric Acid Doped Polybenzimidazole and Its Composites with Inorganic Proton Conductors", Journal of Membrane Science, Dec. 1, 2003, vol. 226, No. 1-2, pp. 169-184.
Henkensmeier D et al., "Overview: State-of-the Art Commercial Membranes for Anion Exchange Membrane Water Electrolysis," Journal of Electrochemical Energy Conversion and Storage, 2021, 18, 024001 (18 pp.).
Hernandez, M.G. et al., "Novel, Metal-Free, Superacid-Catalyzed "Click" Reactions of Isatins with Linear, Nonactivated, Multiring Aromatic Hydrocarbons", Macromolecules, 2010, vol. 43, pp. 6968-6979.
Hickner M et al., "Membrane Databases—New Schema and Dissemination (Supplement to: Development of Design Rules for High Hydroxide Transport in Polymer Architectures)," at the 2019 U.S. Department of Energy (DOE) Hydrogen and Fuel Cells Program Annual Merit Review and Peer Evaluation Meeting on Apr. 29-May 1, 2019 in Crystal City, Virginia, accessible at https://www.hydrogen.energy.gov/pdfs/review19/ia022_hickner_2019_p.pdf (last accessed Dec. 15, 2020), 14 pp.
Hu, H. et al "Preparation and Characterization of Anion Exchange Membranes based on Fluorinated Poly(aryl ether oxadiazole)s for AEMFCs Applications", International Journal of Hydrogen Energy, 2012, pp. 61, https://kns.cnki.net/KCMS/detail/detail.aspxdbname=CMFD201401&filename=1013302180.nh.
Huang, B. et al., "Synthesis and Characterization of Poly(ether amide ether ketone)/Poly(ether ketone ketone) Copolymers", Journal of Applied Polymer Science, 2011, vol. 119, pp. 647-653.
Hwang T et al., "Ultrafiltration using graphene oxide surface-embedded polysulfone membranes," Separation and Purification Technology, 2016, 166, 41-47.
IL office action dated Feb. 21, 2023, in application No. IL294876, with English Translation.
IN Office Action dated Dec. 26, 2022 in Application No. IN202117027525.
IN Office Action dated Feb. 1, 2024 in IN Application No. 202117027525.
IN Office Action dated Mar. 2, 2024 in IN Application No. 202117027525.
IN Office Action dated Mar. 23, 2022 in Application No. IN202037050645.
International Preliminary Report on Patentability and written opinion dated Aug. 4, 2022 in Application PCT/2021/US14759.
International Preliminary Report on Patentability issued on Jan. 7, 2020 in Application No. PCT/US2018/040898.
International Preliminary Report on Patentability issued on Jun. 25, 2019 in Application No. PCT/US2017/067482.
International Preliminary Report on Patentability issued on May 23, 2017, in Application No. PCT/US2015/061036.
International Preliminary Report on Patentability issued on Oct. 27, 2020, in Application No. PCT/US2019/028925.

(56) References Cited

OTHER PUBLICATIONS

International Search Report and Written Opinion issued Nov. 30, 2018 in Application No. PCT/US2018/040898.
International Search Report and Written Opinion issued on Feb. 4, 2016, in Application No. PCT/US2015/061036.
International Search Report and Written Opinion issued on Mar. 25, 2020, in Application No. PCT/US2019/063173.
International Search Report and Written Opinion issued on Mar. 6, 2018, in Application No. PCT/US2017/067482.
International Search Report and Written Opinion issued on May 27, 2021, in Application No. PCT/US2021/014759.
International Search Report and Written Opinion issued on Sep. 16, 2019, in Application No. PCT/US2019/028925.
International Search Report issued on Dec. 4, 2018 in Application No. PCT/US2018/040898.
Jeon JY et al., "Efficient Preparation of Styrene Block Copolymer Anion Exchange Membranes via One-Step Friedel-Crafts Bromoalkylation with Alkenes," Organic Process Research & Development, 2019, 23(8), 1580-1586.
Jeon JY et al., "Functionalization of Syndiotactic Polystyrene via Superacid-Catalyzed Friedel-Crafts Alkylation," Topics in Catalysis, 2018, 61(7-8), 610-615.
Jeon, J.Y., et al., "Ionic Functionalization of Polystyrene-b-poly(Ethylene-co-butylene)-b-polstyrene via Friedel-crafts Bromoalkylation and Its Application for Anion Exchange Membranes," ECS Transactions, Aug. 24, 2017, vol. 80, No. 8, pp. 967-970, XP055507090.
Jeon JY et al., "Synthesis of aromatic anion exchange membranes by Friedel-Crafts bromoalkylation and cross-linking of polystyrene block copolymers," Macromolecules, 2019, 52(5), 2139-2147.
Jeong, Y. et al., "Polymerization of a Photochromic Diarylethene by Friedel-Crafts Alkylation", Macromolecules, 2006, vol. 39, pp. 3106-3109.
Jia W et al., "Gas transport characteristics of fluorinated polystyrene-b-polybutadiene-b-polystyrene (F-SBS)," Journal of Membrane Science, 2019, 591, 117296 (24 pp.).
Jo TS et al., "Highly efficient incorporation of functional groups into aromatic main-chain polymer using iridium-catalyzed C—H activation and Suzuki- Miyaura reaction," Journal of the American Chemical Society 131, 2009,(5), 1656-1657.
Jo TS et al., "Synthesis of quaternary ammonium ion-grafted polyolefins via activation of inert C—H bonds and nitroxide mediated radical polymerization," Journal of Polymer Science Part A: Polymer Chemistry, 2009, 47(18), 4519-4531.
Jo TS et al., "Synthesis of sulfonated aromatic poly(ether amide) s and their application to proton exchange membrane fuel cells," Journal of Polymer Science Part A: Polymer Chemistry, 2009, 47(2), 485-496.
JP Notice of Refusal issued on Dec. 15, 2020 for Application No. 2020-008602.
JP Notice of Refusal issued on May 7, 2020 for Application No. 2017-526894.
JP Notice of Refusal issued on Oct. 23, 2019 for Application No. 2017-526894.
JP Office Action dated Mar. 7, 2023 in Application No. JP2020-559544 with English translation.
JP Office Action dated Oct. 31, 2023, in application No. JP2021-529055, with English Translatio.
JP Search Report by Authorized Searching Authority issued Nov. 17, 2020 for Application No. 2020-008602.
JP Search Report by Authorized Searching Authority issued Sep. 18, 2019 for Application No. 2017-526894.
Kazakova, et al., "Trifluoromethanesulfonic Acid in Organic Synthesis," Russian Journal of Organic Chemistry, 2017, vol. 53, No. 4, pp. 485-509.
Kim E et al., "Nanoscale building blocks for the development of novel proton exchange membrane fuel cells," The Journal of Physical Chemistry B, 2008, 112(11), 3283-3286.

Kim JH et al., "Fabrication of dense cerium pyrophosphate-polystyrene composite for application as low-temperature proton-conducting electrolytes," Journal of The Electrochemical Society, 2015, 162(10), F1159-F1164.
Kim S et al., "A Novel Sulfonated Aromatic Polymer Membrane with Different Pendant Groups for Vanadium Redox Flow Batteries (VRFBs)," 2018 AIChE Annual Meeting, 2018, 103g (3 pp.).
Kim S et al., "Novel Sulfonated Aromatic Polymer Membranes for Breaking the Coulombic and Voltage Efficiency Trade-Off Limitation in Vanadium Redox Flow Battery," 236th ECS Meeting (Oct. 13-17, 2019), ECS Meeting Abstracts, 2019, MA2019-02, 565 (2 pp.).
Kim YS, "Advanced Materials for Fully-Integrated MEAs in AEMFCs," presented at the 2018 U.S. Department of Energy (DOE) Hydrogen and Fuel Cells Program and Vehicle Technologies Office Annual Merit Review and Peer Evaluation Meeting on Jun. 13-15, 2018 in Washington, DC, accessible at https://www.hydrogen.energy.gov/pdfs/review18/fc146_kim_2018_o.pdf (last accessed Dec. 15, 2020), 25 pp.
Kim YS, "Scalable Elastomeric Membranes for Alkaline Water Electrolysis," presented at the 2019 U.S. Department of Energy (DOE) Hydrogen and Fuel Cells Program Annual Merit Review and Peer Evaluation Meeting on Apr. 29-May 1, 2019 in Crystal City, Virginia, accessible at https://www.hydrogen.energy.gov/pdfs/review19/p159_kim_2019_o.pdf (last accessed Dec. 15, 2020), 22 p.
Kim YS, "Scalable Elastomeric Membranes for Alkaline Water Electrolysis," presented at the 2020 U.S. Department of Energy Hydrogen and Fuel Cells Program Annual Merit Review and Peer Evaluation Meeting on May 20, 2020, accessible at https://www.hydrogen.energy.gov/pdfs/review20/p159_kim_2020_p.pdf (last accessed Dec. 15, 2020), 29 p.
Kim YS et al., "A New Class of Fuel Cells Based on Ion Pair-Coordinated Proton Exchange Membranes," 232nd ECS Meeting (Oct. 1-5, 2017), ECS Meeting Abstracts, 2017, MA2017-02, 1470 (2 pp.).
Kim YS et al., "Scalable Elastomeric Membranes for Alkaline Water Electrolysis," presented at the 2018 U.S. Department of Energy (DOE) Hydrogen and Fuel Cells Program Annual Merit Review and Peer Evaluation Meeting on Jun. 13-15, 2018 in Washington, D.C., accessible at https://www.hydrogen.energy.gov/pdfs/review18/pd159_kim_2018_p.pdf (last accessed Dec. 15, 2020), 23 pp.
Kim YS et al., "HydroGEN Seedling: Scalable Elastomeric Membranes for Alkaline Water Electrolysis," in 2018 Annual Progress Report: DOE Hydrogen and Fuel Cells Program, U.S. Department of Energy, Document No. DOE/GO-102019-5156, Apr. 2019, accessible at https://www.hydrogen.energy.gov/pdfs/progress18/h2f_kim_2018.pdf (last accessed Dec. 15, 2020), 4 pp.
Kim YS, "Polymer-based fuel cells that operate from 80-220°C," presented at the 2018 U.S. Department of Energy (DOE) Hydrogen and Fuel Cells Program and Vehicle Technologies Office Annual Merit Review and Peer Evaluation Meeting on Jun. 13-15, 2018 in Washington, DC, accessible at https://www.hydrogen.energy.gov/pdfs/review18/fc175_kim_2018_o.pdf (last accessed Dec. 15, 2020), 24 pp.
Kimura, K.W., et al., "Selective Electrochemical CO2 Reduction During Pulsed Potential Stems From Dynamic Interface," ACS Catalysis, ACS Paragon Plus Environment, University of Illinois at Urbana-Champaign, Downloaded from pubs.acs.org on Jun. 30, 2020, 31 pages.
Ko K et al., "Effect of Temperature on Nanophase-segregation and Transport in Polysulfone-Based Anion Exchange Membrane Fuel Cell: Molecular Dynamics Simulation Approach," Bulletin of the American Physical Society, 2013, 58(1), H1.307 (1 p.).
KR Office Action dated Feb. 28, 2022, in KR Application No. KR1020177016429 with English translation.
Kraglund MR et al., "Ion-solvating membranes as a new approach towards high rate alkaline electrolyzers," Energy & Environmental Science, 2019, 12, 3313-3318.
Kraglund MR et al., Supplementary information for "Ion-solvating membranes as a new approach towards high rate alkaline electrolyzers," Energy & Environmental Science, 2019, 12, 3313-3318 (19 pp.).

(56) References Cited

OTHER PUBLICATIONS

Kreuer KD, "On the development of proton conducting polymer membranes for hydrogen and methanol fuel cells," Journal of Membrane Science, 2001, 185, 29-39.

Le TP et al., "Miscibility and acid strength govern contact doping of organic photovoltaics with strong polyelectrolytes," Macromolecules, 2015, 48(15), 5162-5171.

Lee, W. et al., "Poly (terphenylene) anion exchange membranes: the effect of backbone structure on morphology and membrane property," ACS Macro Letters, 2017, vol. 6, No. 5, pp. 566-570.

Lee, W. et al., "Robust Hydroxide Ion Conducting Poly(biphenyl)s for Alkaline Fuel Cell Membranes," ACS Macro Letters, 2015, vol. 4, No. 8, pp. 814-818.

Lee WH et al., "Fluorene-based hydroxide ion conducting polymers for chemically stable anion exchange membrane fuel cell," ACS Macro Letters, 2015, 4(4), 453-457.

Lee WH et al., "Molecular Engineering of Aromatic Polymer Electrolytes for Anion Exchange Membranes," ECS Transactions, 2017, 80(8), 941-944.

Lee WH et al., "Molecular Engineering of Ion-Conducting Polymers for Fuel Cell Membrane Applications," ECS Transactions, 2015, 69(17), 357-361.

Lee WH et al., Supporting Information for "Robust Hydroxide Ion Conducting Poly(biphenyl)s for Alkaline Fuel Cell Membranes," ACS Macro Letters, 2015, 4(8), 814-818 (pp. 1-16).

Lee YB et al., "Effect of Ammonium Ion Structures on Properties of Alkaline Exchange Membrane Fuel Cells," ECS Transactions, 2010, 33(1), 1889-1892.

Lee YB et al., "Novel Synthetic Approach and their Properties for Alkaline Exchange Polysulfone Membranes," 2011 ECS Meeting Abstracts, MA2011-02, 866 (2 pp.).

Leng Y et al., "Solid-State Water Electrolysis with an Alkaline Membrane," Journal of the American Chemical Society, 2012, 134, 9054-9057.

Leng Y et al., Supporting Information for "Solid-State Water Electrolysis with an Alkaline Membrane," Journal of the American Chemical Society, 2012, 134, 9054-9057 (13 pp.).

Leonard DP et al., "Asymmetric electrode ionomer for low relative humidity operation of anion exchange membrane fuel cells," Journal of Materials Chemistry A, 2020, 8(28), 14135-14144.

Lim, H. et al., "Synthesis of Microporous Polymers by Friedel-crafts Reaction of 1-bromoadamantane with Aromatic Compounds and Their Surface Modification", Polymer Chemistry, 2012, vol. 3, pp. 868-870.

Liu, Z. et al., "$BF_3 \cdot Et_2O$-mediated Friedel-Crafts C—H bond polymerization to synthesize Π-conjugation-interrupted polymer semiconductors", Polymer Chemistry, 2011, vol. 2, pp. 2179-2182.

Luo X et al., "Mesoscale Simulations of Quaternary Ammonium-Tethered Triblock Copolymers: Effects of the Degree of Functionalization and Styrene Content," Journal of Physical Chemistry C, 2020, 124(30), 16315-16323.

Maeyama, K. et al., "2,2'—Bis(4-benzoylphenoxy)biphenyl: A Novel Efficient Acyl-acceptant Monomer Yielding Wholly Aromatic Polyketones via Friedel-Crafts Type Polymerization with Arenedicarbonyl Chloride", Polymer Journal, 2004, vol. 36, No. 2, pp. 146-150.

Maeyama, K. et al., "Effective Synthesis of Wholly Aromatic Polyketones Using 2,2'—Diaryloxybiphenyl and Arenedicarboxylic Acid Derivatives via Friedel-crafts Type Acylation Polymerization", Reactive & Functional Polymers, 2004, vol. 61, pp. 71-79.

Mallakpour, S. E, et al., "Polymerization of N-methylpyrrole With Bis-triazolinediones via Electrophilic Aromatic Substitution", Journal of Polymer Science: Part A: Polymer Chemistry, Oct. 1987, vol. 25, 2781-2790.

Mallakpour, S. E, et al., "Uncatalyzed Polymerization of Bistriazolinediones with Electron-Rich Aromatic Compounds via Electrophilic Aromatic Substitution", Journal of Polymer Science: Part A: Polymer Chemistry, 1989, vol. 27, 217-235.

Matanovic I et al., "Adsorption of polyaromatic backbone impacts the performance of anion exchange membrane fuel cells," Chemistry of Materials, 2019, 31(11), 4195-4204.

Maurya S et al., "On the origin of permanent performance loss of anion exchange membrane fuel cells: Electrochemical oxidation of phenyl group," Journal of Power Sources, 2019, 436, 226866.

Maurya S et al., "Polyaromatic Ionomers for High Performance Alkaline Membrane Fuel Cells," ECS Meeting Abstracts, 2019, MA2019-02, 1572 (3 pp.).

Maurya S et al., "Rational design of polyaromatic ionomers for alkaline membrane fuel cells with 1 W cm-2 power density," Energy & Environmental Science, 2018, 11(11), 3283-3291.

Maurya S et al., "Surface adsorption affects the performance of alkaline anion-exchange membrane fuel cells," ACS Catalysis, 2018, 8(10), 9429-9439.

Meek KM et al., "High-Throughput Anion Exchange Membrane Characterization at NREL," ECS Transactions, 2019, 92(8), 723-731.

Mittelsteadt C et al., "Dimensionally Stable High Performance Membranes," presented at the 2016 U.S. Department of Energy (DOE) Hydrogen and Fuel Cells Program and Vehicle Technologies Office Annual Merit Review and Peer Evaluation Meeting on Jun. 6-10, 2019 in Washington, D.C., accessible at https://www.hydrogen.energy.gov/pdfs/review16/fc150_mittelsteadt_2016_p.pdf (last accessed Dec. 15, 2020), 19 pp.

Mochizuki T et al., "Simple, Effective Molecular Strategy for the Design of Fuel Cell Membranes: Combination of Perfluoroalkyl and Sulfonated Phenylene Groups," ACS Energy Letters, 2016, 1(2), 348-352 (Abstract and Supporting Information only, 11 pp.).

Mohanty AD et al., "Anion Exchange Fuel Cell Membranes Prepared from C—H Borylation and Suzuki Coupling Reactions," Macromolecules, 2014, 47, 1973-1980.

Mohanty AD et al., "Mechanistic analysis of ammonium cation stability for alkaline exchange membrane fuel cells," Journal of Materials Chemistry A, 2014, 2(41), 17314-17320.

Mohanty AD et al., "Stable Elastomeric Anion Exchange Membranes Based on Quaternary Ammonium-Tethered Polystyrene-b-poly(ethylene-co-butylene)-b-polystyrene Triblock Copolymers," Macromolecules, 2015, 48(19), 7085-7095.

Mohanty AD et al., "Thermochemical stability study of alkyl-tethered quaternary ammonium cations for anion exchange membrane fuel cells," Journal of the Electrochemical Society, 2017, 164(13), F1279-F1285.

Mohanty AD et al., "Transition Metal-Catalyzed Functionalization of Polyolefins Containing C—C, C=C, and C—H Bonds," Advances in Organometallic Chemistry, 2015, 64, 1-39.

Mohanty AD et al., "Systematic alkaline stability study of polymer backbones for anion exchange membrane applications," Macromolecules, 2016, 49(9), 3361-3372.

Mohanty AD et al., "Systematic Analysis of Cation Stability in Alkaline Exchange Membrane Fuel Cells," ECS Transactions, 2014, 64(3), 1221-1228.

Noh S et al., "Molecular engineering of hydroxide conducting polymers for anion exchange membranes in electrochemical energy conversion technology," Accounts of Chemical Research, 2019, 52(9), 2745-2755.

Norsten TB et al., "Highly fluorinated comb-shaped copolymers as proton exchange membranes (PEMs): improving PEM properties through rational design," Advanced Functional Materials, 2006, 16, 1814-1822.

Notice of Allowance dated Nov. 22, 2021 in U.S. Appl. No. 16/553,965.

Notice of Allowance issued on May 25, 2021, in U.S. Appl. No. 16/788,506.

Notice of Allowance issued on May 29, 2019, in U.S. Appl. No. 15/527,967.

Nystuen, N. J, et al., "Friedel-crafts Polymerization of Fluorene With Methylene Chloride, Methoxyacetyl Chloride, and Chloromethyl Methyl Ether", Journal of Polymer Science, 1985, vol. 23, 1433-1444.

Office Action issued on Feb. 25, 2021, in U.S. Appl. No. 16/471,358.
Office Action issued on Jan. 6, 2021, for U.S. Appl. No. 16/628,879.
Office Action issued on May 25, 2021, in U.S. Appl. No. 16/553,965.

(56) References Cited

OTHER PUBLICATIONS

Office Action issued on Sep. 10, 2020, in U.S. Appl. No. 16/471,358.
Olvera, L.I. et al., "Novel High Molecular Weight Aromatic Fluorinated Polymers from One-Pot, Metal-Free Step Polymerizations", Macromolecules 2013, vol. 46, pp. 7245-7256.
Pagels M et al., "Synthetic Approach to Hydrocarbon Proton Exchange Membranes Using Anion Exchange Membrane Precursors," ECS Meeting Abstracts, 2020, MA2020-02, 2237 with Presentation (19 pp.).
Pagels MK et al., "One-Pot Synthesis of Proton Exchange Membranes from Anion Exchange Membrane Precursors," ACS Macro Letters, 2020, 9(10), 1489-1493.
Pagels MK et al., Supporting Information for "One-Pot Synthesis of Proton Exchange Membranes from Anion Exchange Membrane Precursors," ACS Macro Letters, 2020, 9(10), 1489-1493 (14 pp.).
Pagels MK et al., "Synthesis of anion conducting polymer electrolyte membranes by Pd- Catalyzed Buchwald-Hartwig Amination coupling reaction," Tetrahedron, 2019, 75(31), 4150- 4155.
Park, E.J. et al., "Chemically durable polymer electrolytes for solid-state alkaline water electrolysis," Journal of Power Sources, 2018, vol. 375, pp. 367-372.
Park EJ et al., "Dimethyl Substituted Polyaromatic Alkaline Ionomers for Better Alkaline Hydrogen Oxidation," ECS Meeting Abstracts, 2018, MA2018091, 1753 (3 pp.).
Park EJ et al., "How does a small structural change of anode ionomer make a big difference in alkaline membrane fuel cell performance?," Journal of Materials Chemistry A, 2019, 7(43), 25040-25046.
Park EJ et al., "Superacidic porous polymer catalyst and its application in esterification of carboxylic acid," Structural Chemistry, 2017, 28(2), 493-500.
Park EJ et al., "Versatile functionalization of aromatic polysulfones via thiol-ene click chemistry," Journal of Polymer Science Part A: Polymer Chemistry, 2016, 54(19), 3237-3243.
Park IS et al., "Sulfonated Polyamide Based IPMCs," Proceedings of SPIE, Electroactive Polymer Actuators and Devices (EAPAD) 2009, 7287, 72870X.
Park J et al., "A comparison study of ionic polymer-metal composites (IPMCs) fabricated with Nafion and other ion exchange membranes," Proceedings of SPIE, Electroactive Polymer Actuators and Devices (EAPAD) 2013, 8687, 868714.
Park J et al., "Electromechanical performance and other characteristics of IPMCs fabricated with various commercially available ion exchange membranes," Smart materials and structures, 2014, 23(7), 074001.
Parrondo J et al., "Synthesis and Alkaline Stability of Solubilized Anion Exchange Membrane Binders Based on Poly(phenylene oxide) Functionalized with Quaternary Ammonium Groups via a Hexyl Spacer," Journal of The Electrochemical Society, 2015, 162, F1236-F1242.
Parshad, R., "Determination of Transverse Wave Velocities in Solids", Nature, Nov. 30, 1946, vol. 158, pp .789-790.
Pena, E.R., et al., "Factors Enhancing the Reactivity of Carbonyl Compounds for Polycondensations with Aromatic Hydrocarbons. A Computational Study," Macromlecules, 2004, 37(16), 6227-6235.
Perret R et al., "IV.F.4 Hydrogen Fuel Cells and Storage Technology Project," in 2008 Annual Progress Report: DOE Hydrogen Program, U.S. Department of Energy, accessible at https://www.hydrogen.energy.gov/pdfs/progress08/iv_f_4_perret.pdf (last accessed Dec. 15, 2020), pp. 776-786.
Perret R et al., "IV.G.1 Hydrogen Fuel Cells and Storage Technology Project (FCAST)," in 2007 Annual Progress Report: DOE Hydrogen Program, U.S. Department of Energy, accessible at https://www.hydrogen.energy.gov/pdfs/progress07/iv_g_1_perret.pdf (last accessed Dec. 15, 2020), pp. 638-647.
Perret R et al., "IV.G.4 Fundamental Research for Optimization of Hydrogen Storage and Utilization," in 2006 Annual Progress Report: DOE Hydrogen Program, U.S. Department of Energy, accessible at https://www.hydrogen.energy.gov/pdfs/progress06/iv_g_4_perret.pdf (last accessed Dec. 15, 2020), pp. 575-581.
Perret R et al., "IV.H.5 Hydrogen Fuel Cells and Storage Technology Project," in 2009 Annual Progress Report: DOE Hydrogen Program, U.S. Department of Energy, accessible at https://www.hydrogen.energy.gov/pdfs/progress09/iv_h_5_perret.pdf (last accessed Dec. 15, 2020), pp. 801-807.
Powers W et al., "Borylation of Polystyrene: Random Blocky vs. Truly Random Copolymers," Bulletin of the American Physical Society, 2009, 54(1), C1.089 (1 p.).
Sepehr, F., et al., "Mesoscale Simulations of Anion Exchange Membranes Based on Quaternary Ammonium Tethered Triblock Copolymers," Macromolecules, Jun. 5, 2017, vol. 50, pp. 4397-4405, XP055564626.
Shin D et al., "Ch. 8: Anion Exchange Membranes: Stability and Synthetic Approach," in The Chemistry of Membranes Used in Fuel Cells: Degradation and Stabilization, S. Schlick (eds.), Wiley, 2018, pp. 195-228.
Shin J et al., "A new homogeneous polymer support based on syndiotactic polystyrene and its application in palladium-catalyzed Suzuki-Miyaura cross-coupling reactions," Green Chemistry, 2009, 11(10), 1576-1580.
Shin J et al., "Borylation of Polystyrene," Synfacts 2008 (2), 145.
Shin J et al., "Controlled Functionalization of Crystalline Polystyrenes via Activation of Aromatic C- H Bonds," Macromolecules, 2007, 40(24), 8600-8608.
Shin J et al., "Hydrophilic functionalization of syndiotactic polystyrene via a combination of electrophilic bromination and Suzuki-Miyaura reaction," Journal of Polymer Science Part A: Polymer Chemistry, 2010, 48(19), 4335-4343.
Shin J et al., "Hydrophilic graft modification of a commercial crystalline polyolefin," Journal of Polymer Science Part A: Polymer Chemistry, 2008, 46(11), 3533-3545.
Sivakami JN et al., "'Kick-started' oxetanes in photoinitiated cationic polymerization: scale-up synthesis and structure-property studies," Proceedings of RadTech International UV & EB Technology Expo & Conference (held on May 15-18, 2016 in Chicago, IL), 2016, 5 pp.
Smedley SB et al., "Measuring water hydrogen bonding distributions in proton exchange membranes using linear Fourier Transform Infrared spectroscopy," Solid State Ionics, 2015, 275, 66-70.
Smedley SB et al., "Spectroscopic Characterization of Sulfonate Charge Density in Ion-Containing Polymers," The Journal of Physical Chemistry B, 2017, 121(51), 11504-11510.
Tian D et al., "Phosphoric Acid-Doped Biphenyl-Backbone Ion-Pair Coordinated Pems with Broad Relative Humidity Tolerance," ECS Meeting Abstracts, 2020, MA2020-02, 2240 (2 pp.).
Tian D et al., "Phosphoric Acid-Doped Ion-Pair Coordinated PEMs with Broad Relative Humidity Tolerance," Energies, 2020, 13(8), 1924 (14 pp.).
Tian D et al., "Structure and gas transport characteristics of triethylene oxide-grafted polystyrene-b-poly(ethylene-co-butylene)-b-polystyrene," Journal of Polymer Science 2020, 58(18), 2654-2663.
Tipper, C. F. H., et al., "Some Reactions of Cyclopropane and a Comparison With the Lower Olefins. Part IV. Friedel-crafts Polymerisation", Journal of the Chemical Society, 1959, pp. 1325-1359.
Trant C et al., "Impact of Microstructured Morphology on Macroscale Properties of Semi-Crystalline Triblock Copolymer Anion Exchange Membranes," ECS Meeting Abstracts, 2020, MA2020-01, 2267 (2 pp.).
Trant C et al., "Synthesis and Characterization of Anion-Exchange Membranes Using Semicrystalline Triblock Copolymers in Ordered and Disordered States," Macromolecules 2020, 53(19), 8548-8561.
U.S. Final office Action dated Jan. 11, 2023 in U.S. Appl. No. 17/309,401.
U.S. Corrected Notice of Allowability dated Dec. 27, 2021, in U.S. Appl. No. 16/553,965.
U.S Corrected Notice of Allowability Dec. 15, 2021 in U.S. Appl. No. 16/788,506.
U.S. Corrected Notice of Allowance dated Aug. 4, 2023, in U.S. Appl. No. 17/658,627.
U.S. Corrected Notice of Allowance dated Dec. 8, 2022 in U.S. Appl. No. 16/471,358.
U.S. Corrected Notice of Allowance dated Jan. 26, 2024 in U.S. Appl. No. 17/569,564.

(56) References Cited

OTHER PUBLICATIONS

U.S. Corrected Notice of Allowance dated Nov. 27, 2023 in U.S. Appl. No. 17/569,564.
U.S. Final Office Action dated Sep. 7, 2023, in U.S. Appl. No. 17/309,401.
US Final Office Action mailed Sep. 3, 2021, in U.S. Appl. No. 16/553,965.
U.S. Non-Final Office Action dated Aug. 2, 2024 in U.S. Appl. No. 18/493,772.
U.S. Non-Final office Action dated Jan. 10, 2023 in Application No. 17/652,175.
U.S. Non-Final Office Action dated Jul. 1, 2024 in U.S. Appl. No. 17/050,256.
U.S. Non-Final Office Action dated Mar. 18, 2022, in U.S. Appl. No. 16/471,358.
U.S. Non-Final Office Action dated Oct. 14, 2021 in U.S. Appl. No. 16/842,037.
U.S. Non-Final Office Action dated Oct. 31, 2022 in U.S. Appl. No. 17/569,564.
U.S. Non-Final office Action dated Sep. 29, 2022 in U.S. Appl. No. 17/658,627.
U.S. Notice of Allowance dated Apr. 3, 2024 in U.S. Appl. No. 17/569,564.
U.S. Notice of Allowance dated Feb. 14, 2024 in U.S. Appl. No. 17/569,564.
U.S. Notice of Allowance dated Feb. 28, 2024 in U.S. Appl. No. 17/309,401.
U.S. Notice of Allowance dated Jan. 5, 2024 in U.S. Appl. No. 17/569,564.
U.S. Notice of Allowance dated Jul. 17, 2023 in U.S. Appl. No. 17/658,627.
U.S. Notice of Allowance dated May 30, 2023 in U.S. Appl. No. 17/569,564.
US Notice of Allowance dated on Sep. 8, 2021, in U.S. Appl. No. 16/788,506.
US Notice of Allowance dated on Sep. 15, 2021, in U.S. Appl. No. 16/788,506.
U.S. Notice of Allowance dated Sep. 7, 2023 in U.S. Appl. No. 17/569,564.
U.S. Notice of Allowance dated Sep. 28, 2022 in U.S. Appl. No. 16/471,358.
U.S. Appl. No. 17/758,767, inventors Bae et al., filed Jul. 13, 2022.
U.S. Appl. No. 18/068,649, Inventors Bae et al., filed Dec. 19, 2022.
U.S. Patent Application No. 18/381,141, inventors Bae C, et al., filed Oct. 17, 2023.
U.S. Restriction Requirement dated Feb. 9, 2024 in U.S. Appl. No. 17/050,256.
U.S. Restriction Requirement dated Jan. 6, 2022 in U.S. Appl. No. 16/471,358.
Velasco, V.M. et al., "Novel Aromatic Polymers with Pentafluorophenyl Pendant Groups", Macromolecules, 2008, vol. 41, pp. 8504-8512.
Walgama R et al., "The Effect of Backbone Structure on Functional Properties in Anion Exchange Membranes; Comparison of Poly (fluorene) with Poly (biphenylene) and Poly (terphenylene)s," ECS Meeting Abstracts, 2020, MA2020-02, 2268 (3 pp.).
Wang, J. et al., "Poly(aryl piperidinium) membranes and ionomers for hydroxide exchange membrane fuel cells", Nature Energy, 2019, vol. 4, pp. 392-398.
Wang J et al., Supplementary Information for "Poly(aryl piperidinium) membranes and ionomers for hydroxide exchange membrane fuel cells," Nature Energy, 2019, 4, 392-398 (13 pp.).
Wang T et al., "Poly (terphenylene) anion exchange membranes with high conductivity and low vanadium permeability for vanadium redox flow batteries (VRFBs)," Journal of Membrane Science, 2020, 598, 117665.
Wang T et al., Supplementary Information for "Suppressing vanadium crossover using sulfonated aromatic ion exchange membranes for high performance flow batteries," Materials Advances, 2020, 1(7), 2206-2218 (15 pp.).
Wang T et al., "Suppressing vanadium crossover using sulfonated aromatic ion exchange membranes for high performance flow batteries," Materials Advances, 2020, 1(7), 2206-2218.
Weck PF et al., "Nanoscale building blocks for the development of novel proton-exchange membranes fuel cells: A first-principles study," Bulletin of the American Physical Society, 2008, 53(2), C1.095 (1 p.).
Wi SN et al., "Study of Water Dynamics in Superacidic Hydrocarbon Proton Exchange Membranes Using Solid-State and Pulsed-Field Gradient NMR Spectroscopy," National High Magnetic Field Laboratory 2015 Annual Research Report, 2015 (1 p.).
Xu H, "Novel Fluorinated Ionomer for PEM Fuel Cells," presented at the 2018 U.S. Department of Energy (DOE) Hydrogen and Fuel Cells Program and Vehicle Technologies Office Annual Merit Review and Peer Evaluation Meeting on Jun. 13-15, 2018 in Washington, DC, accessible at https://www.hydrogen.energy.gov/pdfs/review18/fc185_xu_2018_p.pdf (last accessed Dec. 15, 2020), 15 pp.
Xu, Y., et al., "Self-Cleaning CO2 Reduction Systems: Unsteady Electrochemical Forcing Enables Stability," ACS Energy Letters, 2021, 6, pp. 809-815.
Yang ZT et al., "Photoinitiated cationic polymerization of sustainable epoxy and oxetane thermosets," Proceedings of RadTech International UV & EB Technology Expo & Conference (held on May 15-18, 2016 in Chicago, IL), 2016, 5 pp.
Yim W et al., "Development of Ultrafiltration Membrane-Separation Technology for Energy-Efficient Water Treatment and Desalination Process," Final Report for DOE Award No. DE-SC0005062, 2016, 18 pp.
Yin Z et al., "An alkaline polymer electrolyte CO2 electrolyzer operated with pure water," Energy & Environmental Science, 2019, 12, 2455-2462.
Yin Z et al., Supporting Information for "An alkaline polymer electrolyte CO2 electrolyzer operated with pure water," Energy & Environmental Science, 2019, 12, 2455-2462 (7 pp.).
Yokota et al., "Anion Conductive Aromatic Block Copolymers Continuing Diphenyl Ether or Sulfide Groups for Application to Alkaline Fuel Cells," vol. 6, No. 19, Oct. 8, 2014, pp. 17044-17052.
Yonezawa, N. et al., "Electrophilic Aromatic Acylation Synthesis of Wholly Aromatic Polyketones Composed of 2,2'-Dimethoxybiphenylene Units", 2003, Polymer Journal, vol. 35, No. 12, pp. 998-1002.
Yonezawa, N, et al., "Synthesis of Wholly Aromatic Polyketones", Polymer Journal, 2009, vol. 41, No. 11, pp. 899-928.
Yoshimura K et al., "Aromatic Polymer with Pendant Perfluoroalkyl Sulfonic Acid for Fuel Cell Applications," Macromolecules, 2009, 42(23), 9302-9306 (Abstract and Supporting Information only, 8 pp.).
Zelovich T et al., "Ab initio molecular dynamics study of hydroxide diffusion mechanisms in nanoconfined structural mimics of anion exchange membranes," The Journal of Physical Chemistry C, 2019, 123(8), 4638-4653.
Zelovich T et al., "Anion Exchange Membranes with Low Hydration Conditions from an Ab Initio Molecular Dynamics Perspective," ECS Meeting Abstracts, 2019, MA2019-01, 1957 (2 pp.).
Zelovich T et al., "Hydroxide ion diffusion in anion-exchange membranes at low hydration: insights from ab initio molecular dynamics," Chemistry of Materials, 2019 31(15), 5778-5787.
Zeng QH et al., "Anion exchange membranes based on quaternized polystyrene-block-poly (ethylene-ran-butylene)-block-polystyrene for direct methanol alkaline fuel cells," Journal of Membrane Science, 2010, 349(1-2), 237-243.
Zhu L et al., "Effects of tertiary amines and quaternary ammonium halides in polysulfone on membrane gas separation properties," Journal of Polymer Science Part B: Polymer Physics, 2018, 56(18), 1239-1250.
U.S. Final Office Action dated Dec. 31, 2024 in U.S. Appl. No. 17/050,256.
AU Examination Report dated Aug. 28, 2024, in AU Application No. 2019388889.
BR Office Action dated Aug. 12, 2024 in BR Application No. 112022014554-3 with English Translation.
CA Office Action dated Nov. 4, 2024 in CA Application No. 3120957.

(56) References Cited

OTHER PUBLICATIONS

JP Office Action dated Oct. 8, 2024 in JP Application No. 2022-542716 with English translation.
KR Office Action dated Aug. 9, 2024 in KR Application No. 10-2021-7019702 with English Translation.
KR Office Action dated Sep. 30, 2024 in KR Application No. 10-2020-7033775 with English Translation.

* cited by examiner

| Samples | IEC(mequiv/g) | | WU (wt. %) | λ | In-plane swelling (%) | Cl⁻ σ (mS/cm) 60 °C | OH⁻ σ (mS/cm) | | |
|---|---|---|---|---|---|---|---|---|---|
| | ¹H NMR | Titration | | | | | 30 °C | 60 °C | 80 °C |
| SEBS-C₃-TMA-0.5 | 1.12 | 1.09 | 110 (±5) | 58 | 30 | 18 | 21 | 36 | 50 |
| SEBS-C₄-TMA-0.5 | 1.10 | 1.12 | 123 (±6) | 66 | 26 | 19 | 22 | 37 | 55 |
| SEBS-C₅-TMA-0.5 | 1.09 | 1.02 | 120 (±5) | 65 | 23 | 18 | 20 | 35 | —ᵃ |
| SEBS-C₃-TMA-0.8 | 1.62 | 1.55 | 150 (±10) | 53 | 31 | 30 | 47 | 72 | 93 |
| SEBS-C₄-TMA-0.8 | 1.58 | 1.51 | 155 (±10) | 56 | 32 | 28 | 36 | 60 | —ᵃ |
| SEBS-C₅-TMA-0.8 | 1.55 | 1.45 | 155 (±10) | 56 | 26 | 20 | 23 | 41 | —ᵃ |

FIG. 4

| Samples | Carbocation Source | Degree of functionalization | IEC(mequiv./g) | |
|---|---|---|---|---|
| | | | ¹H NMR[a] | Titration[b] |
| SEBS-en-TMA-0.8 | 6-bromo-1-hexene | 80 % | 1.62 | 1.51 |
| SEBS-C$_5$-TMA-0.4 | 7-bromo-2-methyl-2-heptene | 40 % | 0.91 | 0.90 |
| SEBS-C$_5$-TMA-0.8 | 7-bromo-2-methyl-2-heptene | 80 % | 1.55 | 1.49 |

FIG. 5

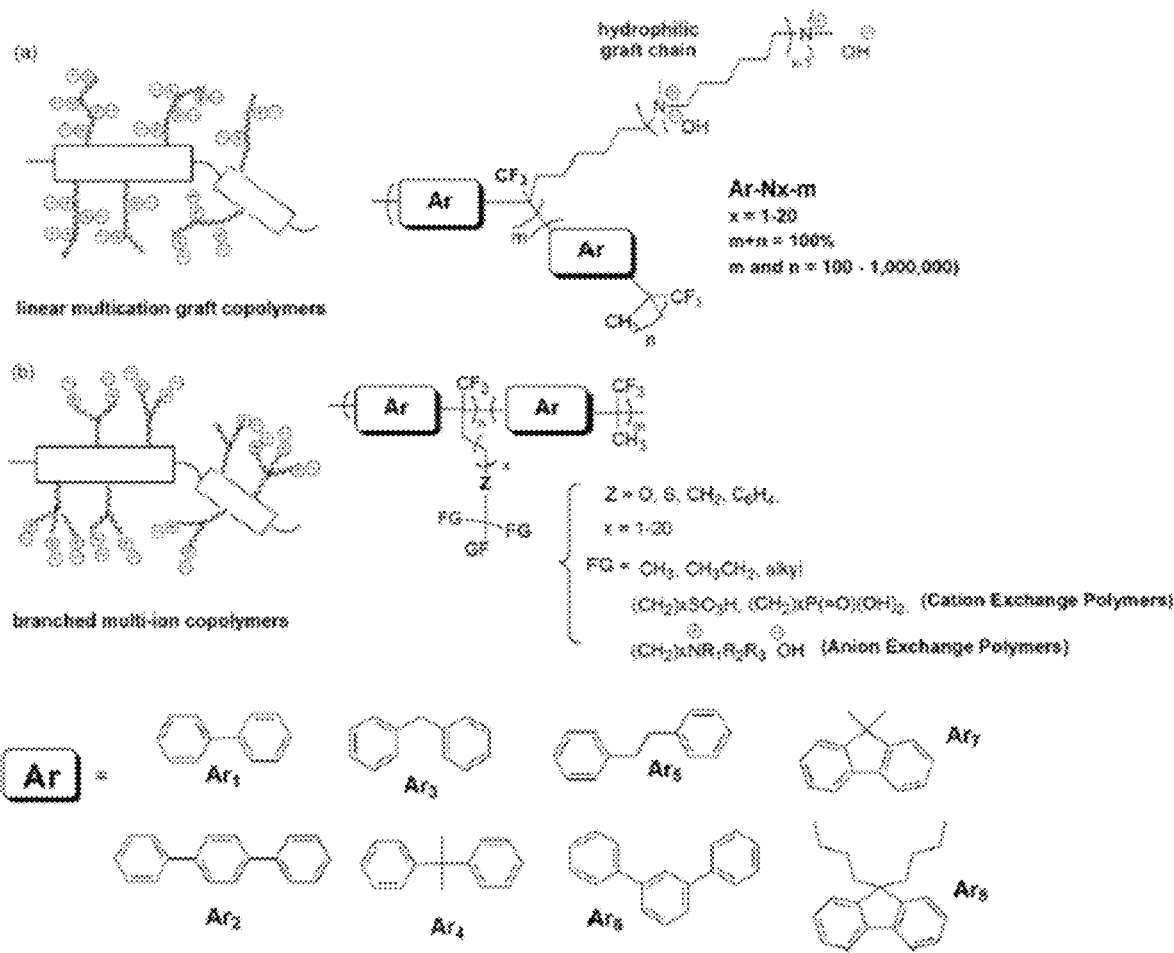
FIG. 6A -B

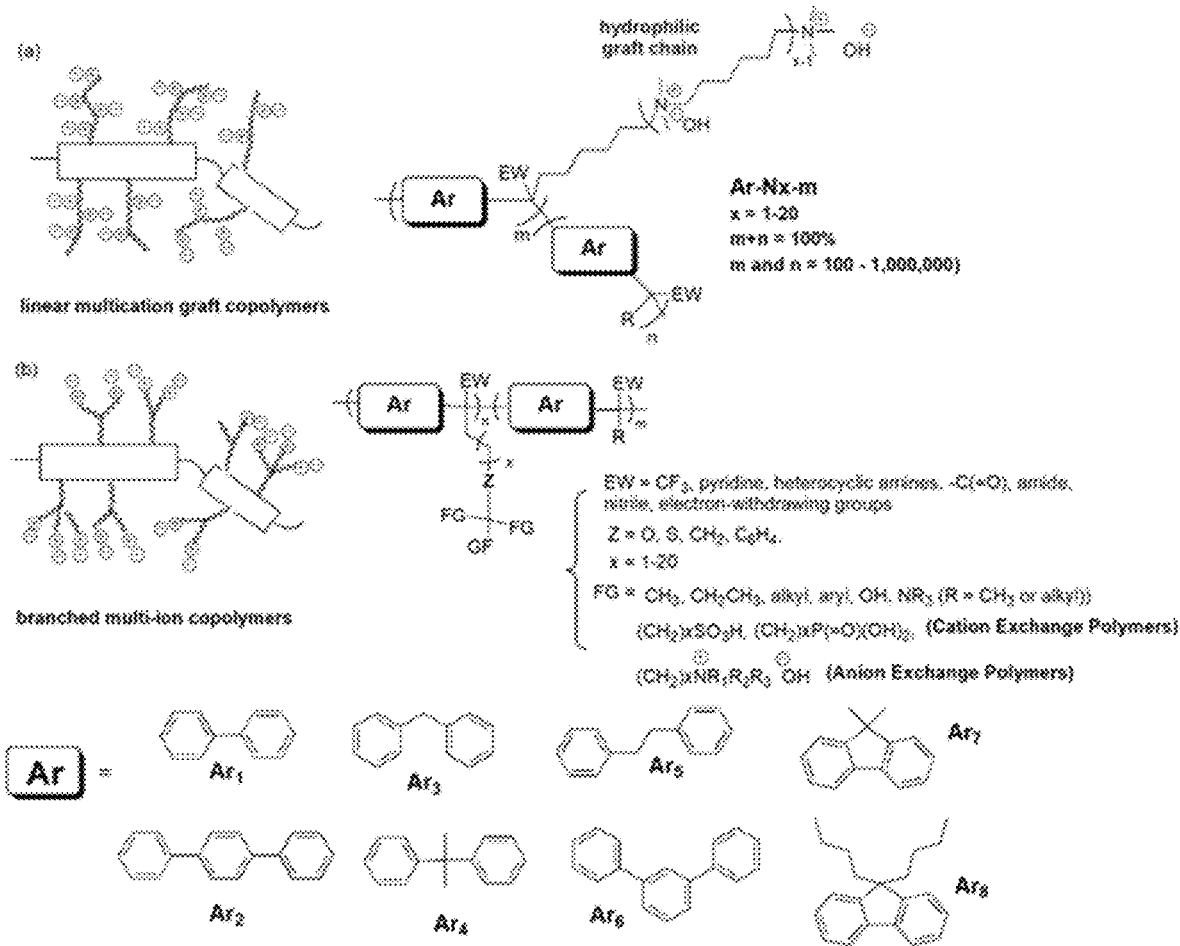
FIG. 7A-B

IONIC FUNCTIONALIZATION OF AROMATIC POLYMERS FOR ION EXCHANGE MEMBRANES

STATEMENT REGARDING FEDERALLY SPONSORED RESEARCH OR DEVELOPMENT

This invention was made with government support under grant nos. 1534289 and 1506245 awarded by the National Science Foundation, and grant nos. DE-AR0000769, DE-AC52-06NA25396 and A30636 awarded by the Department of Energy. The government has certain rights in the invention.

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND

Recently anion exchange membrane (AEM) fuel cells have gained a significant interest because of faster kinetics of oxygen reduction reaction and the possibility to use nonprecious metal for electrocatalysts in alkaline operating condition compared to acidic proton exchange membrane fuel cells. Unfortunately, these potential benefits have not been realized in long-lived fuel cell devices because of the drawbacks of currently available AEMs, which include poor chemical stability in alkaline operating conditions, insufficient mechanical stability, low hydroxide conductivity, and the lack of convenient synthetic methods for rapid synthesis of these materials.

A focus of AEM research has been synthesis of anionic polymer membranes with long-term alkaline stability and high hydroxide conductivity. The durability of AEMs is heavily, dependent on the chemical stability of polymer backbone. For example, poly(arylene ether)s, the most common backbone structure of AEMs, contain aryl ether linkages and the backbone is prone to undergo chain scission in alkaline conditions by the nucleophilic attack of the hydroxide ion, significantly reducing the AEM durability. Due to good chemical stability of backbone in alkaline condition, elastic mechanical property, nanoscale phase separation morphology, and commercial availability, polystyrene-£-poly(ethylene-co-butylene)-£-polystyrene (SEBS) can serve as a promising candidate for preparation of AEMs.

However, when chloromethylation was attempted to introduce a functionality to SEBS for synthesis of AEM, the polystyrene (PS) block of SEBS has resulted in gelation or low levels of functionalization. To overcome these limitations, functionalization of SEBS for AEM applications based on transition metal-catalyzed C—H borylation and Suzuki coupling reactions has been attempted. However, the use of expensive transition metal catalysts, such as Ir and Pd, can be a major barrier to broader application of the reaction, particularly at scale.

SUMMARY

Some embodiments of the disclosed subject matter are directed to an electrochemical energy conversion system including an anode, a cathode, and an ion exchange membrane disposed between the anode and the cathode. In some embodiments, the ion exchange membrane is a moisture diffusion membrane (sometimes referred to as a pervaporation membrane). In some embodiments, the ion exchange membrane includes comprising a polymer having an aromatic polymer chain, an alkylated substrate including a linker, an alkyl chain, and at least one ionic group, wherein the alkylated substrate is bound to at least one aromatic group in the polymer chain. In some embodiments, the alkylated substrate is attached to the aromatic polymer chain via Friedel-Crafts alkylation of the at least one aromatic group. In some embodiments, the alkylated substrate is bound by the linker to at least one aromatic group in the aromatic polymer chain via Friedel-Crafts alkylation of the at least one aromatic group with a haloalkylated precursor substrate.

In some embodiments, the aromatic polymer chain includes polystyrene, polysulfone, poly(phenylene oxide), poly(phenylene), polystyrene copolymers, polysulfone copolymers, poly(phenylene oxide) copolymers, poly(phenylene) copolymers, or combinations thereof. In some embodiments, the alkyl chain has a length of 1 to about 20 carbons. In some embodiments, the at least one ionic group includes an alkylammonium group, a sulfonate group, a phosphonate group, a carboxylate group, an amine, or an alcohol. In some embodiments, the linker is a secondary, tertiary, or quaternary carbon. In some embodiments, the haloalkylated precursor substrate includes a haloalkylated tertiary alcohol, a haloalkylated alkene, or combinations thereof. In some embodiments, the haloalkylated precursor substrate includes 7-bromo-2-methylheptan-2-ol, 6-bromo-2-methylhexan-2-ol, 5-bromo-2-methylpentan-2-ol, 6-bromo-1-hexene, 7-bromo-2-methyl-2-heptene, or combinations thereof. In some embodiments, the polymer includes the structure according to formula III:

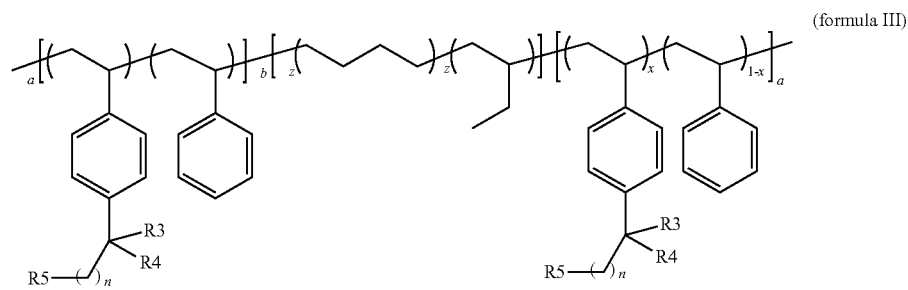

(formula III)

wherein R3 includes H, CH$_3$, or (CH$_2$)$_n$R5, R4 includes H, CH$_3$, or (CH$_2$)$_n$R5, R5 includes at least one ionic group, n=1 to about 20, a/b is about 0.05 to about 0.5 by weight of the polymer according to formula III, and x=0.05 to about 0.95.

Some embodiments of the disclosed subject matter are directed to a method of making an ion exchange membrane material including providing a reaction medium including an aromatic polymer chain, a haloalkylated precursor substrate, and an acid catalyst, the haloalkylated precursor substrate including an alkyl chain and a halide group; reacting the haloalkylated precursor substrate via Friedel-Crafts alkylation of an aromatic group in the aromatic polymer chain with the haloalkylated precursor substrate to attach the alkyl chain and the halide group to the aromatic group; and performing a substitution reaction to replace the halide group with at least one ionic group. In some embodiments, the acid catalyst includes triflic acid, trifluoroacetic acid, sulfuric acid, methanesulfonic acid, para-toluenesulfonic acid, or combinations thereof.

In another aspect, a polymer according to formula IV, is provided.

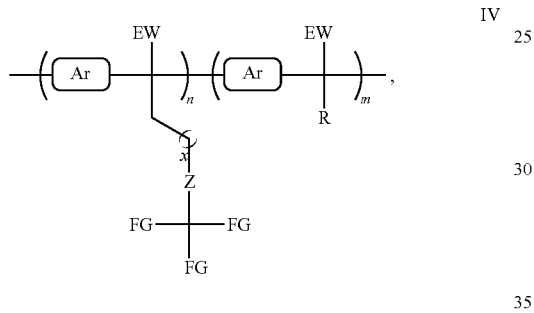

IV wherein Ar is an aryl;
Z is selected from the group consisting of O, S, CH$_2$, and C$_6$H$_4$;
R is an alkyl;
FG comprises a moiety selected from the group consisting of an alkyl, an aryl, OH, a sulfonate, a phosphonate, and a quaternary ammonium group, wherein at least one FG comprises an ionic moiety;
EW comprises a moiety selected from the group consisting of an electron-withdrawing group, CF$_3$, a nitrile, an amide, a pyridine, a heterocyclic amine, —C═O, and an amide;
x is from 1 to 20;
n and m are each independently from 100 to 1,000,000.

In some embodiments, the polymer of formula IV is an anion exchange polymer. In some embodiments, at least one FG comprises a quaternary ammonium group. For example, at least one FG may include (CH$_2$)$_x$·N$^+$R$_1$R$_2$R$_3$, wherein R$_1$, R$_2$, and R$_3$ is each an alkyl (e.g., methyl). In some embodiments EW is CF$_3$. In some embodiments, Ar in formula IV includes

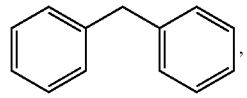  (1)

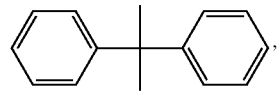  (2)

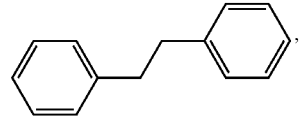  (3)

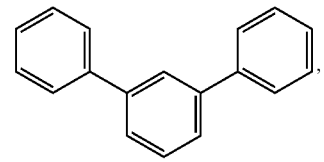  (4)

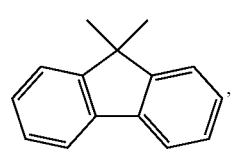  (5)

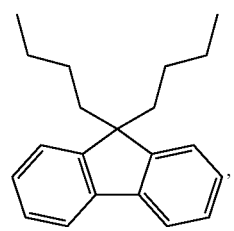  (6)

(7)

(8)

or combinations thereof.

In some embodiments the polymer of formula IV has formula V:

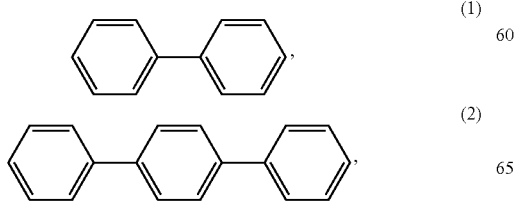

V

In some embodiments, the polymer is a cation exchange polymer. In some embodiments, at least two FGs in a repeating unit include an ionic moiety. In some embodiments, at least three FGs in a repeating unit include an ionic moiety.

In another aspect, a polymer according to formula VI, is provided:

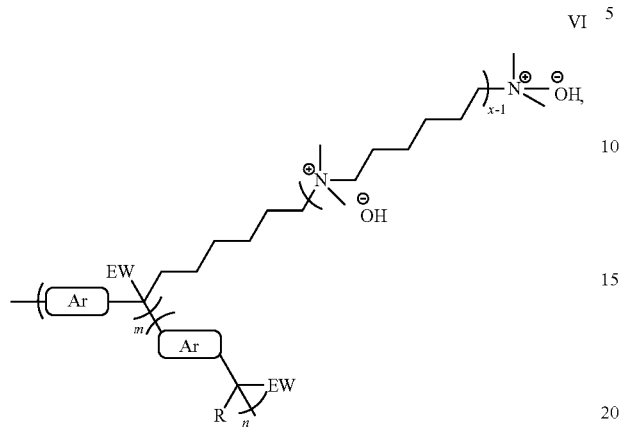

(VI)

wherein Ar is an aryl;

R is an alkyl;

EW comprises a moiety selected from the group consisting of an electron-withdrawing group, $CF_3$, a nitrile, an amide, a pyridine, a heterocyclic amine, —C=O, and an amide;

x is from 1 to 20;

n and m are each independently from 100 to 1,000,000.

In some embodiments EW is $CF_3$. In some embodiments Ar in formula VI includes

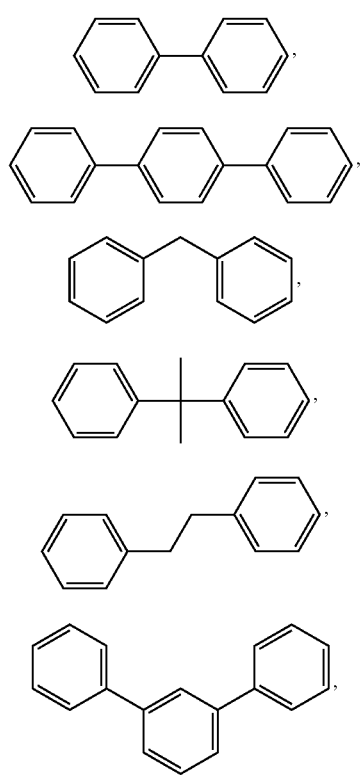

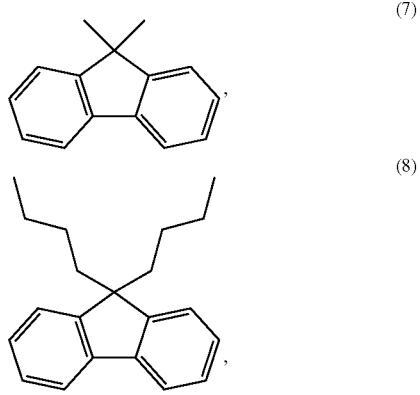

or combinations thereof.

In some embodiments the polymer of formula VI has formula VII:

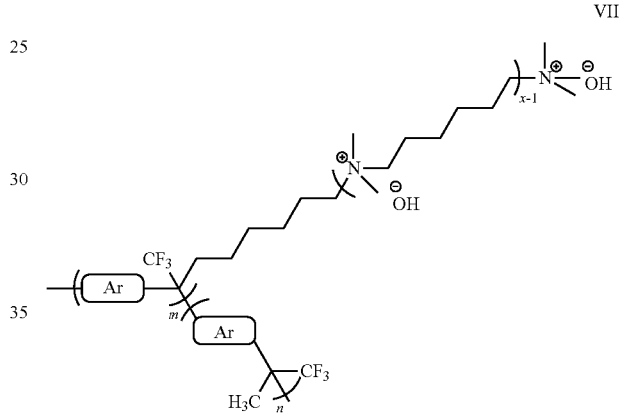

(VII)

In another aspect, a polymer according to formula VIII, is provided:

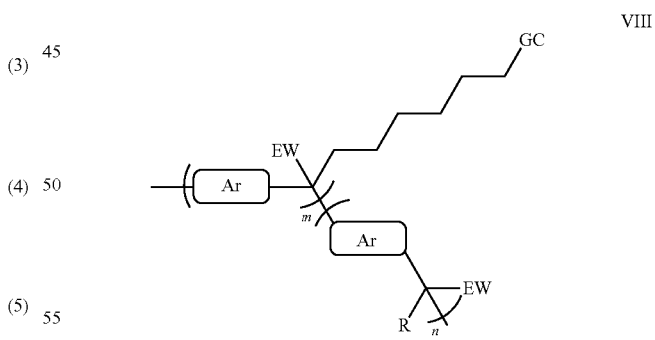

(VIII)

wherein GC is a graft chain comprising multiple ionic moieties;

wherein Ar is an aryl;

R is an alkyl;

EW comprises a moiety selected from the group consisting of an electron-withdrawing group, $CF_3$, a nitrile, an amide, a pyridine, a heterocyclic amine, —C=O, and an amide;

x is from 1 to 20;

n and m are each independently from 100 to 1,000,000.

In some embodiments the multiple ionic moieties include multiple quaternary ammonium groups. In some embodiments EW is $CF_3$. In some embodiments Ar in formula VIII includes:

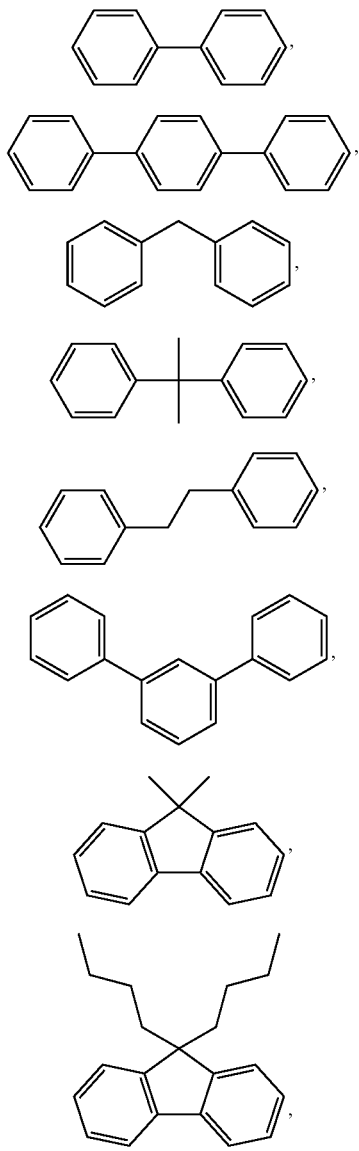

or combinations thereof.

In some embodiments R is an alkyl and EW is $CF_3$.

BRIEF DESCRIPTION OF THE DRAWINGS

The drawings show embodiments of the disclosed subject matter for the purpose of illustrating the invention. However; it should be understood that the present application is not limited to the precise arrangements and instrumentalities shown in the drawings, wherein:

FIG. 4 is a chart of measured properties representative of some exemplary polymers according to some embodiments of the present disclosure; and FIG. 5 is a chart of measured properties representative of some exemplary polymers according to some embodiments of the present disclosure.

FIG. 6A is a chart illustrating a linear multication graft copolymer according to some embodiments of the present disclosure.

FIG. 6B is a chart illustrating a branched multi-ion copolymer according to some embodiments of the present disclosure.

FIG. 7A is a chart illustrating a linear multication graft copolymer according to some embodiments of the present disclosure.

FIG. 7B is a chart illustrating a branched multi-ion copolymer according to some embodiments of the present disclosure.

DETAILED DESCRIPTION

Figure 1:
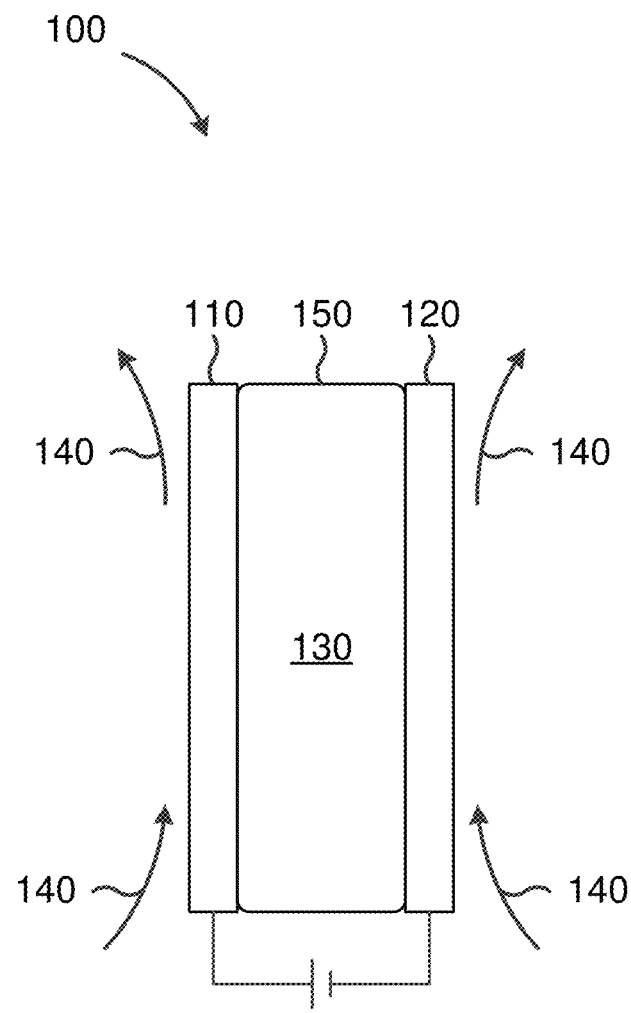
FIG. 1 is a schematic drawing of an electrochemical energy conversion system including an ion exchange membrane according to some embodiments of the present disclosure.

Referring now to FIG. 1, aspects of the disclosed subject matter include an electrochemical energy conversion system 100 including an anode 110, a cathode 120, and an electrolyte 130 disposed between the anode and the cathode. System 100 is suitable for use in numerous applications, such as fuel cells, energy recovery ventilation systems; water hydrolysis systems, electrochemical hydrogen compressors, batteries, sensors, actuators, etc. In some embodiments, anode 110 and cathode 120 are composed of any suitable material for use with electrolyte 130 in system 100. Further, system 100 includes any suitable inlets/outlets 140 to supply reactants to and remove reaction products from anode 110, cathode 120, and electrolyte 130.

In some embodiments, electrolyte 130 is a solid electrolyte. In some embodiments, electrolyte 130 is an ion exchange membrane 150. In some embodiments, ion exchange membrane 150 is an anion exchange membrane or a cation exchange membrane. In some embodiments, the ion exchange membrane is a moisture diffusion membrane. In some embodiments, the ion exchange membrane 150 is at least in part composed of a functionalized base polymer. In some embodiments, the base polymer is an aromatic polymer, e.g., a polymer chain whose structure includes aromatic rings. At least some of the aromatic polymers are functionalized with at least one hydrocarbon chain and at least one ionic group. In some embodiments, the polymer includes the structure according to formula I:

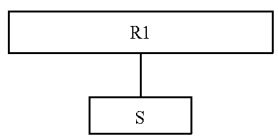

(formula I)

where R1 is an aromatic polymer chain and S is at least one alkylated substrate. In some embodiments, the alkylated substrate includes at least one hydrocarbon group (Ak) and at least one ionic group (R2) as generally depicted in formula II:

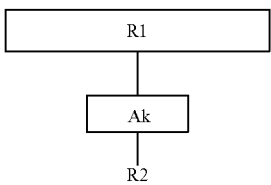

(formula II)

In some embodiments, S is bound to at least one aromatic group in R1. In some embodiments, the hydrocarbon group Ak of S is bound directly to the at least one aromatic group in R1. In some, S includes a linker which is bound directly to the at least one aromatic group in R1, as will also be discussed in greater detail below. In some embodiments, R2 is a head group disposed at an end of Ak.

In some embodiments, R1 includes polystyrene, polysulfone, poly(phenylene oxide), poly(phenylene), polystyrene copolymers, polysulfone copolymers, poly(phenylene oxide) copolymers, poly(phenylene) copolymers, block copolymers including polystyrene, polystilfone, or poly(phenylene oxide), poly(phenylene), or combinations thereof. In some embodiments, R1 includes polystyrene-b-poly(ethylene-co-butylene)-b-polystyrene. In some embodiments, R1 has a degree of functionalization between about 5% and about 95%, i.e., between about 5% and about 95% of the aromatic groups in R1 are functionalized with at least one S.

In some embodiments, Ak includes a hydrocarbon group having a length of 1 to about 20 carbons. In some embodiments, the hydrocarbon group has a length of about 2 to about 4 carbons. In some embodiments, the hydrocarbon group is a hydrocarbon chain (branched or unbranched), a hydrocarbon ring, or combinations thereof. In some embodiments, the hydrocarbon group is fully saturated. In some embodiment, the hydrocarbon group includes at least one unsaturated carbon. In some embodiments, the hydrocarbon group is an alkyl group, e.g., an alkyl chain. In some embodiments, the alkyl chain has a length of 1 to about 2.0 carbons. In some embodiments, the alkyl chain has a length of about 2 to about 4 carbons. In some embodiments, the alkyl chain has a length of 3 carbons. In some embodiments, the at least one ionic group includes an alkylammonium group, a sulfonate group, a phosphonate group, a carboxylate group, an amine, or an alcohol. In some embodiments, the at least one ionic group includes two or more ionic groups. In some embodiments, the two or more ionic groups are the same. In some embodiments, the two or more ionic groups are different.

In some embodiments, the polymer includes the structure according to formula III:

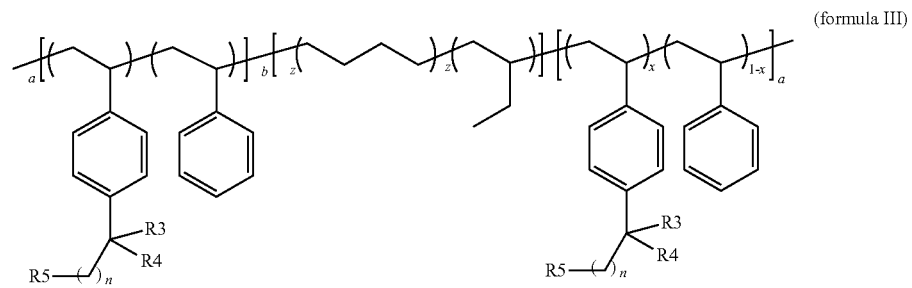

(formula III)

where R3 includes H, CH$_3$, or (CH$_2$)$_n$R5, R4 includes H, CH$_3$, or (CH$_2$)$_n$R5, R5 includes at least one ionic group, n=1 to about 20, a/b is about 0.05 to about 0.5 by weight of the polymer according to formula III, and x is at least 0.05. In some embodiments, n is about 2 to about 4. In some embodiments, n=3. In some embodiments, x is about 0.05 to about 0.95. In some embodiments, x is about 0.45 to about 0.95. In some embodiments, x is about 0.7 to about 0.9. In some embodiments, x=0.8. While the aromatic groups from formula III are shown to be functionalized at the C4 carbon, the polymers of the present disclosure are not limited in this regard, as the aromatic groups can be functionalized at any available aromatic group carbon, e.g., the C2, C3, C5, C6, or combinations thereof. In some embodiments, ion exchange membrane 150 is composed substantially entirely of material consistent with the embodiments described above. In some embodiments, the material is incorporated into or attached to a base polymeric structure, such as a commercially available membrane.

Figure 2A:
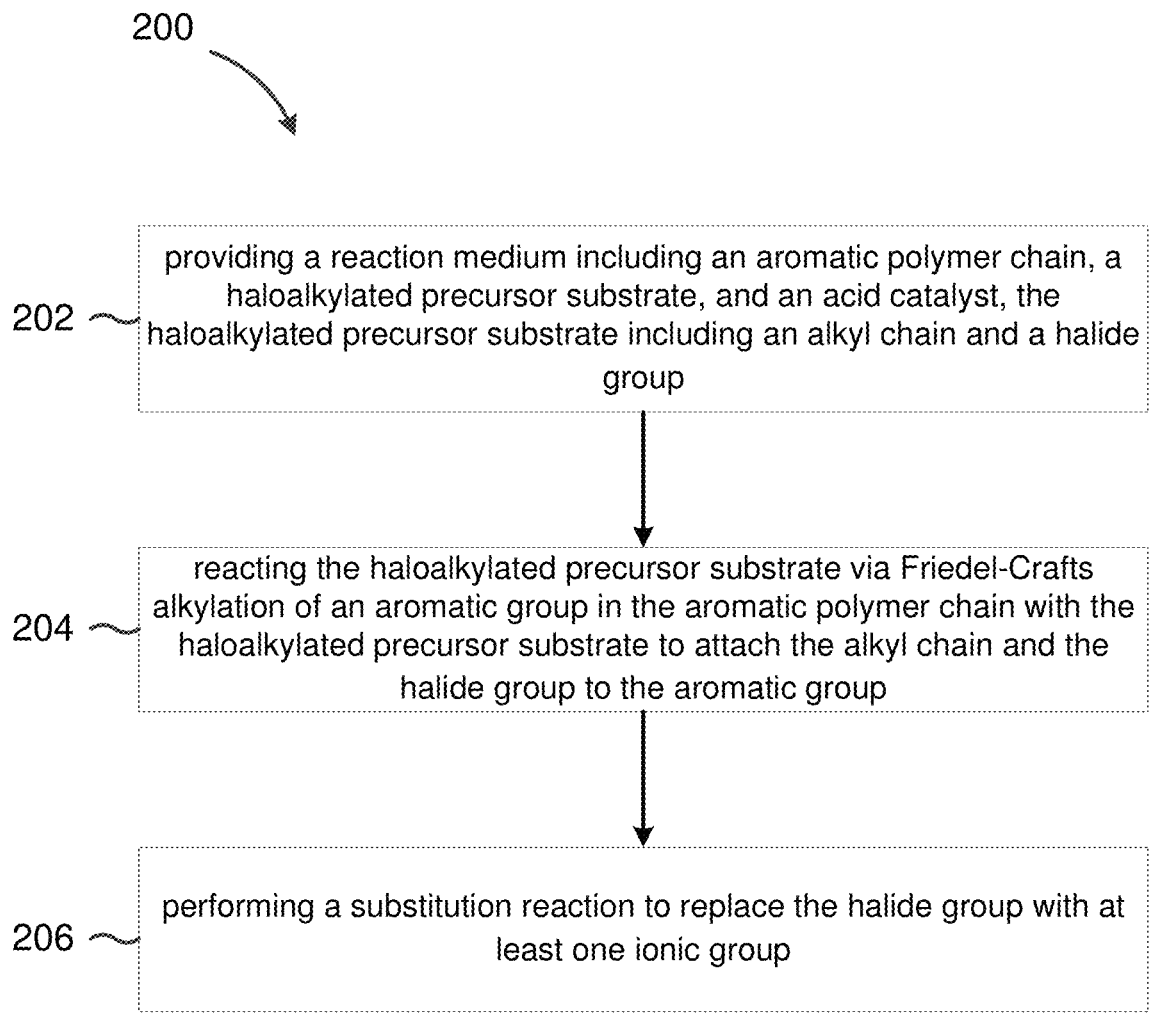
FIG. 2A is a chart of a method for making an ion exchange membrane according to some embodiments of the present disclosure.

Referring now to FIG. 2A, some aspects of the disclosed subject matter include a method 200 of making an ion exchange membrane material. In some embodiments, at 202, a reaction medium is provided that includes an aromatic polymer chain and a precursor substrate. In some embodiments, the precursor substrate includes at least one hydrocarbon group and at least one ionic precursor group. As discussed above, in some embodiments, the hydrocarbon group is a hydrocarbon chain, a hydrocarbon ring, or combinations thereof. In some embodiments, the hydrocarbon group is an alkyl chain. In some embodiments, the ionic precursor group is a halide group, i.e., a group including Br, I, Cl, etc., or combinations thereof. In some embodiments, the precursor substrate includes a haloalkyl group, i.e., includes an alkyl group and a halide group, which is referred to herein as a "haloalkylated precursor substrate." In some embodiments, the precursor substrate, e.g., a haloalkylated precursor substrate, includes a reaction domain. In some embodiments, the reaction domain is configured to react with aromatic groups in the aromatic polymer chain to incorporate the hydrocarbon group and the ionic group into the polymer chain.

At 204, the precursor substrate, e.g., a haloalkylated precursor substrate, is reacted with an aromatic group in the aromatic polymer chain to attach the at least one hydrocarbon group, e.g., an alkyl chain, and the at least one ionic precursor group, e.g., a halide group, to the aromatic group. In some embodiments, reaction 204 occurs between the reaction domain and an aromatic group. In some embodiments, reaction 204 is a Friedel-Crafts alkylation reaction. In some embodiments, the reaction domain is a tertiary alcohol. In some embodiments, the reaction domain is an alkene. Therefore, in some embodiments, the precursor substrate includes a haloalkylated tertiary alcohol, a haloalkylated alkene, or combinations thereof. In some embodiments, the precursor substrate includes 7-bromo-2-methylheptan-2-ol, 6-bromo-2-methylhexan-2-ol, 5-bromo-2-methylpentan-2-ol, 6-bromo-1-hexene, 7-bromo-2-methyl-2-heptene, or combinations thereof.

Figure 2B:
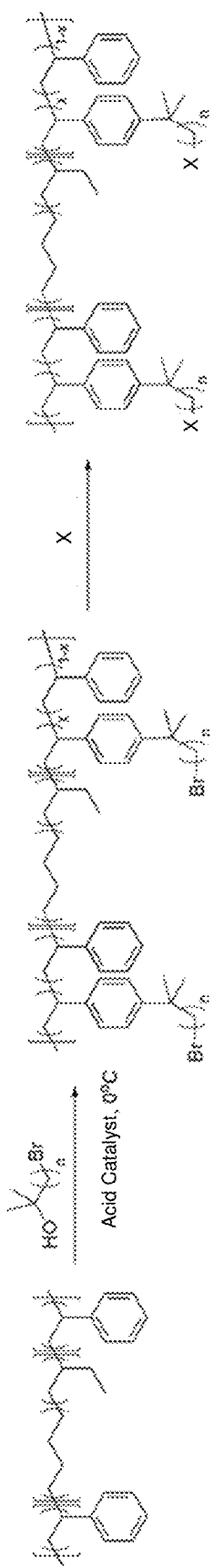
FIG. 2B is a chart of a method for making an ion exchange membrane according to some embodiments of the present disclosure.
Figure 2C:
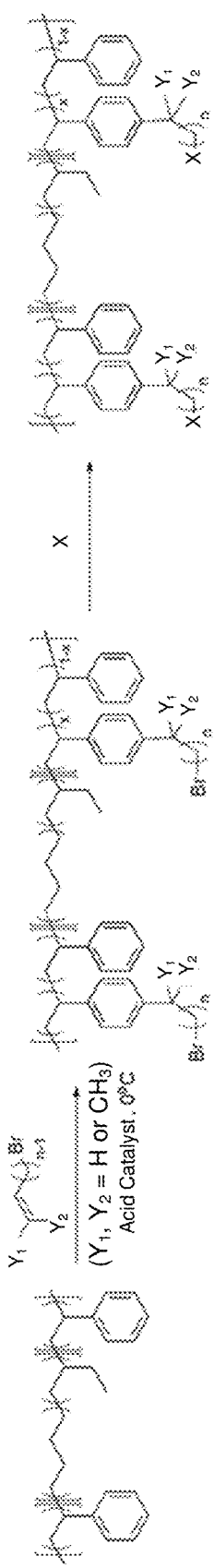
FIG. 2C is a chart of a method for making an ion exchange membrane according to some embodiments of the present disclosure.

In some embodiments, the reaction medium includes an acid catalyst. In some embodiments, the acid catalyst includes triflic acid, trifluoroacetic acid, sulfuric acid, methanesulfonic acid, para-toluenesulfonic acid, or combinations thereof. Without wishing to be bound by theory, during the Friedel-Crafts alkylation reaction, a carbocation is generated in the precursor substrate at the reaction domain in the presence of the acid catalysts. Referring now to FIG. 2B, for example, a haloalkylated tertiary alcohol generates a tertiary carbocation in the presence of an acid catalyst such as triflic acid. The generated tertiary carbocation then readily reacts with π electrons of the aromatic rings of the aromatic polymer chain. The result is a haloalkyl group from the haloalkylated tertiary alcohol bound to an aromatic ring of the aromatic polymer chain, in this case via a linker, e.g., a quaternary carbon. Referring now to FIG. 2C, for example, a haloalkylated alkene generates either a secondary or a tertiary carbocation in the presence of an acid catalyst such as triflic acid. The generated secondary or tertiary carbocation then readily reacts with π electrons of the aromatic rings of the aromatic polymer chain. The result is a haloalkyl group from the haloalkylated alkene bound to an aromatic ring of the aromatic polymer chain, in this case via a linker, e.g., a secondary, tertiary, or quaternary carbon.

As a result of reaction 204, at least some aromatic groups are functionalized with the hydrocarbon group having the ionic precursor group. At 206, in some embodiments, a substitution reaction is performed to replace the ionic precursor group with at least one ionic group. In some embodiments, the at least one ionic group includes an alkylammonium group, a sulfonate group, a phosphonate group, a carboxylate group, an amine, or an alcohol. The specific pendent chains and/or groups that functionalize the aromatic groups are easily tunable by tuning the precursor substrate and the substitute reaction reactants. For example, longer hydrocarbon groups in the precursor substrate can result in a longer tether length between the polymer chain and the at least one ionic group. Further, by adjusting the composition of the reaction medium during substation reaction 206, method 200 can control what ionic groups replace the precursor ionic groups, thus tuning the functionalization of the membrane.

The polymeric materials consistent with the embodiments of the present disclosure are advantageous for use as membrane materials due to their chemical stability. The method of making these polymeric materials is advantageously simplified through use of Friedel-Crafts alkylation reaction steps mentioned above to functionalize suitable aromatic polymer chains in a one or two step reaction scheme, and further allows convenient control over alkyl tether length and ion head groups during functionalization. The catalysts for use in reactions are inexpensive, and advantageously do not produce harmful, or in some cases any, byproducts.

EXAMPLE

Example 1: Preparation with Haloalkylated Tertiaryalcohols

The aromatic rings of polystyrene-b-poly(ethylene-co-butylene)-b-polystyrene (SEBS) (Mn=105,000 g/mol, and Mw/Mn=1.04) with 18 mol % (30 wt. %, 25 vol. %) PS block were functionalized via acid-catalyzed Friedel-Crafts bromoalkylation as discussed above with bromoalkylated tertiary alcohols as a substrate. Without wishing to be bound by theory, as the tertiary alcohol is protonated by a Brønsted acid, it loses water as a byproduct and forms a tertiary carbocation intermediate which can readily react with the π electrons of the aromatic rings to generate bromoalkylated SEBS. Slightly more than 1 eq. of acid (1.1-1.2 eq.) relative to the tert-alcohol reagent was used because the byproduct water is also readily protonated by triflic acid reducing its reactivity. Excessive addition of triflic acid can cause gelation of the polymer. Since the reaction is exothermic, the reaction was conducted at 0° C.

To substitute the halide group, SEBS-C5-Br-0.8 (0.18 g) was dissolved in toluene (4 mL), filtered, and cast onto a glass plate. The dry SEBS-C5-Br-0.8 film (approximately 40 μm thick) was immersed in aqueous trimethylamine (45 wt % in water) at 45° C. for 48 h. The film was rinsed with water and ion exchanged to hydroxide form by immersing in 1M NaOH at room temperature for 48 h in an argon-filled glovebox.

The degree of functionalization (DF) of the PS block was controlled by changing the molar ratio of the tert-alcohol reagent to aromatic ring of the PS block. For example, a reaction with 0.5 eq. of the bromoalkylated tert-alcohol relative to PS block resulted in 50 mol % DF while a reaction with 1.0 eq. of the alcohol reagent resulted in 80 mol % DF, 95 mol % DF could be achieved for the PS block of SEBS when 2.0 eq. of the tert-alcohol was employed, however, the resulting quaternary ammonium (QA) membrane after the amination step (i.e. SEBS-05-TMA-0.95) exhibited instability. SEBS is a thermoplastic elastomer comprised of a soft poly(ethylene-co-butylene) (PEB) block and a hard PS block. Without wishing to be bound by theory, after incorporation of QA groups into the PS block, the water molecules absorbed in the PS block acted as a plasticizer to soften the hard block, resulting in the membrane with increased swelling and reduced mechanical strength. Thus, some balance between ion exchange capacity (WC) and mechanical properties is desirable.

Figure 3:
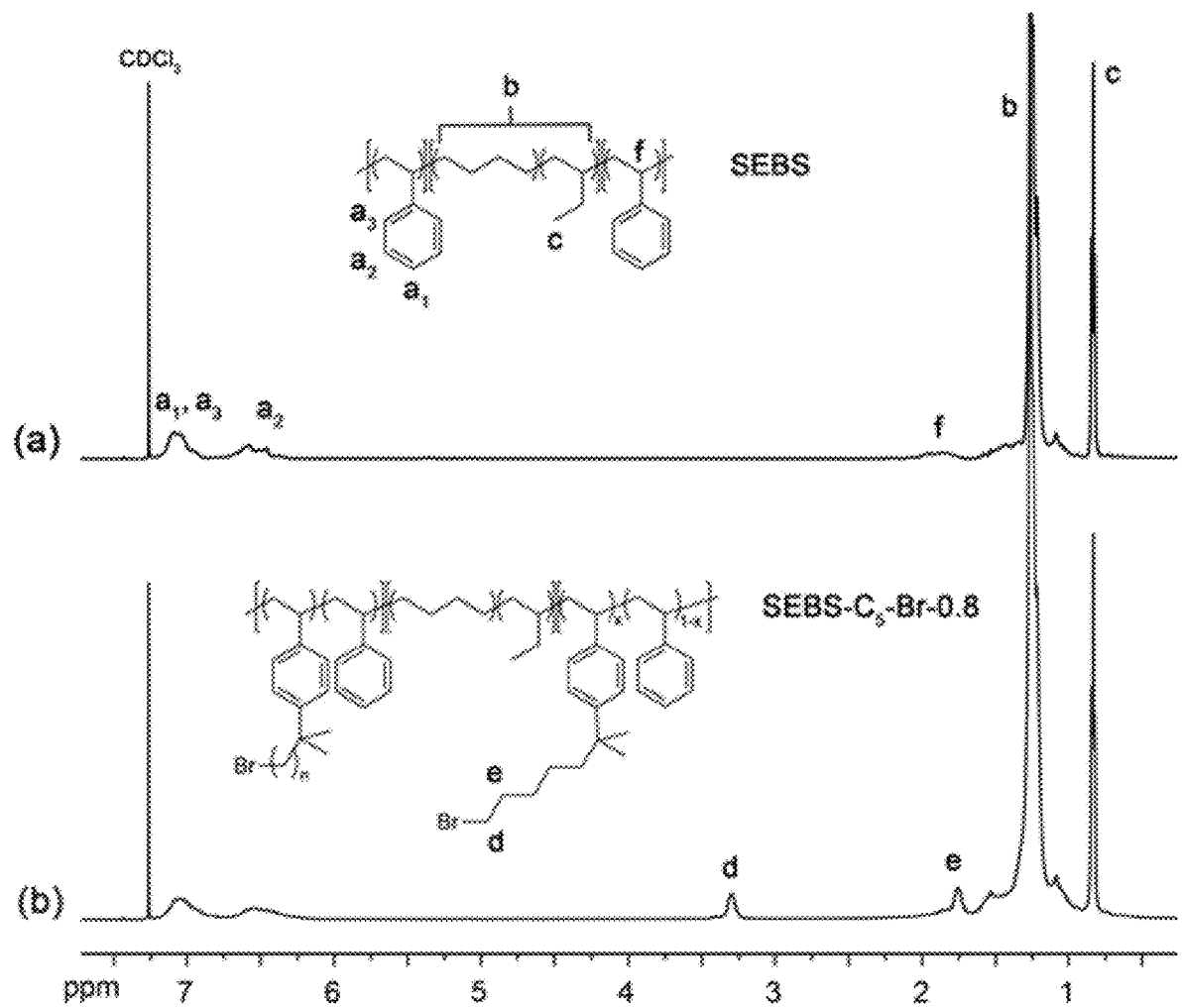
FIG. 3 is a chart showing nuclear magnetic resonance spectra for polystyrene-b-poly(ethylene-co-butylene)-h-polystyrene (SEBS) and polymers according to some embodiments of the present disclosure.

DFs were calculated by comparing proton integration values of the 1H NMR spectra. Referring now to FIG. 3, in the 1H NMR spectrum of pristine SEBS, the integration ratio of Ar—$H_5$ (peaks $a_{1-3}$ at 6.3-7.2 ppm), butylene-$CH_3$ (peak c at 0.7-0.9 ppm), and the other $CH_2$ and CH (peak b at 1.0-2.0 ppm) indicates that the molar ratios of styrene, ethylene, and butylene contents are 18 mol %, 51 mol % and 31 mol %, respectively. After Friedel-Crafts reaction with bromoalkylated alcohols, new proton signals of —$CH_2$Br at 3.2-3.3 ppm (peak d) along with the —$CH_2CH_2$Br signal (peak e) appeared. DB were calculated from the integration ratio of the —$CH_2$Br signal of the functionalized SEBS (peak d) and the butylene-$CH_3$ signal of the pristine SEBS (peak c).

The tether length between the cation head group and the polymer backbone was controlled by modifying the alkyl chain length in the structure of brominated tert-alcohol. Referring now to FIG. 4, a series of bromoalkylated SEBSs with different tether lengths (n=3-5) and different DFs (50 and 80 mol % of PS block) were synthesized. NMR based TECs are expected values of OH⁻ form calculated from the concentrations of bromoalkyl group in 1H NMR spectrum of SEBS-Cn-Br-x. Titration IECs values of SEBS-Cn-TMA-x were from Mohr titration method (average of two experiments). Water uptake was measured at room temperature in OH⁻ form (average of two measurements). Swelling was measured at room temperature in OH⁻ form. OH⁻ σ were measured in water under argon atmosphere.

After amination of bromoalkyl side chains of SEBS-Cn-Br-x with trimethyl amine, the TMA-functionalized polymers, solubility became an issue. Therefore, films of SEBS-Cn-Br-x were cast from a 5 wt. % toluene solution on a glass plate (membrane thickness: 40-50 μm), and subsequent amination was performed by immersing the membranes in an aqueous trimethylamine solution. Completion of the reaction was confirmed by titrated IEC and infrared spectroscopy. The SEBS-$C_n$-TMA-x membranes were flexible, elastomeric, colorless and transparent.

Example 2: Preparation with Haloalkylated Alkenes

Related to the Friedel-Crafts reaction from bromoalkylated tertiary alcohols and SEBS from Example 1, but without wishing to be bound by theory, similar carbocation intermediates could be formed by protonation of an alkene. Unlike the case of alcohol substrates where released water byproduct can be protonated by triflic acid, no such byproduct is generated from the reaction with alkene substrates. Thus, less amount of triflic acid catalyst was used. For example, while 1.1-1.2 equivalent amount of triflic acid was used for the bromoalkylation with alcohol substrates in Example 1, 0.33 equivalent amount of triflic acid was used to induce the bromoalkylation reaction of alkene reagents.

6-bromo-1-hexene and 7-bromo-2-methyl-2-heptene were evaluated for the Friedel-Crafts bromoalkylation with SEBS. DF was controlled by adjusting the amount of bromoalkenes similar to the reaction with tert-alcohol. As protonation of 7-bromo-2-methyl-2-heptene would form the tertiary carbocation intermediate generated from 7-bromo-2-methyl-2-heptanol, it resulted in the same QA SEBS after amination with TMA. However, without wishing to be bound by theory, the protonation of 6-bromo-1-hexene generates a secondary carbocation at C2 initially, which can rearrange to form another secondary carbocation at C3. Thus, a mixture of C2- and C3-tethered bromoalkyl chains was attached to SEBS from the reaction with 6-bromo-1-hexene. Referring now to FIG. 5, following treatment by trimethylamine, the resulting QA polymer (e.g. SEBS-en-TMA-0.8) showed a titrated IEC that agrees well with NMR based IECs from the DF. MR based IECs are expected values of OH⁻ form calculated from the concentrations of bromoalkyl group in 1H MR spectrum of SEBS-Cn-Br-x. Titration IECs values of SEBS-Cn-TMA-x were from Mohr titration method (average of two experiments). Since a variety of bromoalkenes are commercially available or readily obtainable, this polymer functionalization methodology can be adopted to create different structures of QA-tethered aromatic polymers in an atom-economic synthesis without generating byproducts.

OTHER EMBODIMENTS

Referring now to FIGS. 6A-7B, some embodiments of the present disclosure are directed to ion exchange membranes composed of one or more polymers. In some embodiments, the one or more polymers include a polymeric backbone with one or more ions and/or ionic groups, e.g., in one or more side chains along the backbone. In some embodiments, the polymeric backbone includes one or more polyarylenes. In some embodiments, these cationic and anion exchange membranes (CEM and AEM, respectively) polymers do not have ether linkages (—O—) in the polymer main-chain. In some embodiments, one or more multi-ion groups are incorporated onto the polymer side chains. In some embodiments, the side chains include one or more alkyl groups. In some embodiments, the polymer includes linear side chains, branched side chains, or both linear side chains and branched side chains. Specifically referring to FIGS. 6A and 7A, a linear multication graft copolymer consistent with some embodiments of the present disclosure is shown. Specifically referring to FIGS. 6B and 7B, a branched multi-ion copolymer (cation and anion) consistent with some embodiments of the present disclosure is shown. In some embodiments, the side chains are about the same length as the polymer backbone.

In some embodiments, the polyarylenes are produced via from polycondensation reactions of aromatic compounds and trifluoroalkyl ketones using strong acid, e.g., trifluorosulfonic acid (TFSA).

Methods and systems of the present disclosure are advantageous to provide better performing ion-exchange membranes for a wide variety of uses, e.g., alkaline exchange membrane fuel cells, alkaline exchange membrane electrolysis, actuator, battery, and other electrochemical energy conversion/storage applications, water purification. Because ionic groups are clustered in the membrane structure, these ion exchange polymers are expected to provide better transport of ions via ionic-water channels and better stability in alkaline conditions. Further, a wide variety of ionic groups can be incorporated into the ether-free backbone polymers. Finally, the polymers of the present disclosure overcome the alkaline stability issue of AEMs by stabilizing the polymer structure and incorporating more robust cationic groups.

In another aspect, a polymer according to formula IV, is provided.

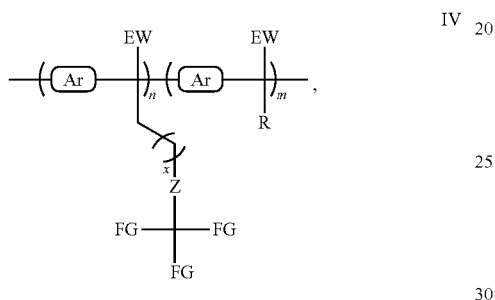

IV wherein Ar is an aryl;
Z is selected from the group consisting of O, S, $CH_2$, and $C_6H_4$;
R is an alkyl;
FG comprises a moiety selected from the group consisting of an alkyl, an aryl, OH, a sulfonate, a phosphonate, and a quaternary ammonium group, wherein at least one FG comprises an ionic moiety;
EW comprises a moiety selected from the group consisting of an electron-withdrawing group, $CF_3$, a nitrile, an amide, a pyridine, a heterocyclic amine, —C=O, and an amide;
x is from 1 to 20;
n and m are each independently from 100 to 1,000,000.

In some embodiments, the polymer of formula IV is an anion exchange polymer. In some embodiments, at least one FG comprises a quaternary ammonium group. For example, at least one FG may include $(CH_2)_x\cdot N^+R_1R_2R_3$, wherein $R_1$, $R_2$, and $R_3$ is each an alkyl (e.g., methyl). In some embodiments EW is $CF_3$. In some embodiments, Ar in formula IV includes

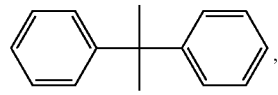 (1)

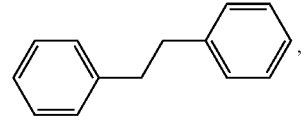 (2)

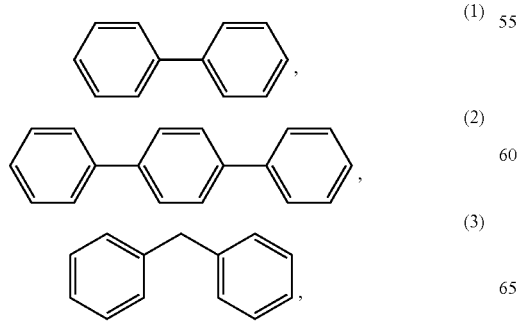 (3)

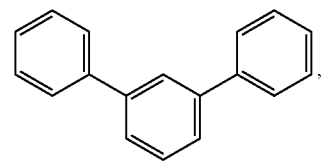 (4)

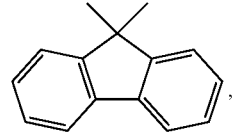 (5)

(6)

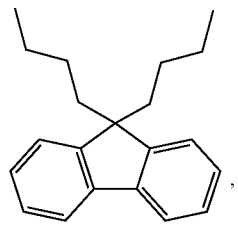 (7)

(8)

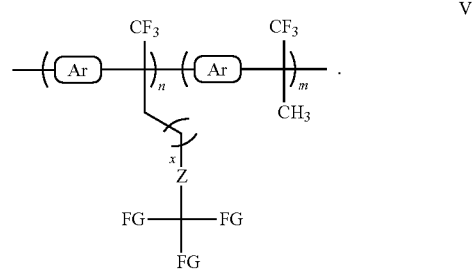

or combinations thereof.

In some embodiments the polymer of formula IV has formula V:

V

In some embodiments, the polymer is a cation exchange polymer. In some embodiments, at least two FGs in a repeating unit include an ionic moiety. In some embodiments, at least three FGs in a repeating unit include an ionic moiety.

In another aspect, a polymer according to formula VI, is provided:

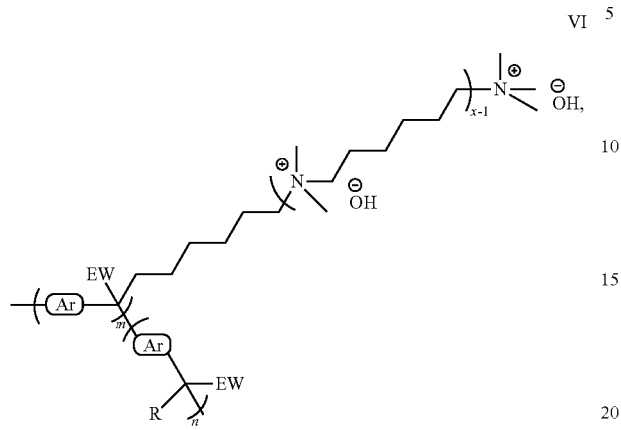

(VI)

wherein Ar is an aryl;

R is an alkyl;

EW comprises a moiety selected from the group consisting of an electron-withdrawing group, $CF_3$, a nitrile, an amide, a pyridine, a heterocyclic amine, —C=O, and an amide;

x is from 1 to 20;

n and m are each independently from 100 to 1,000,000.

In some embodiments EW is $CF_3$. In some embodiments Ar in formula VI includes

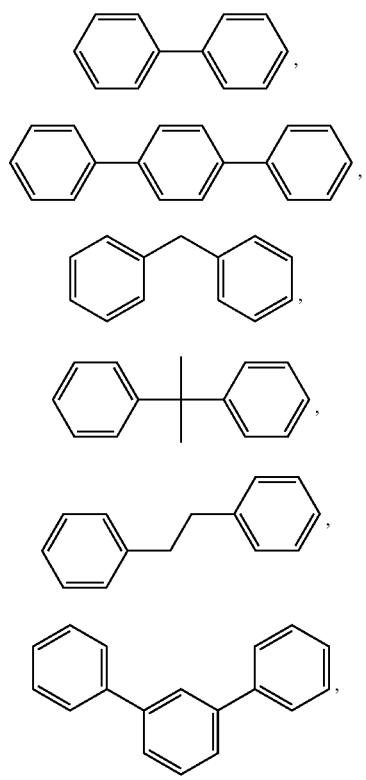

(1), (2), (3), (4), (5), (6)

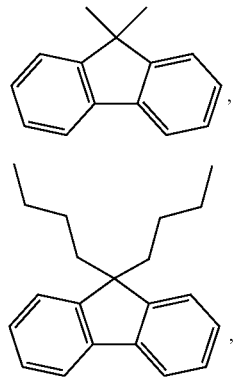

(7), (8)

or combinations thereof.

In some embodiments the polymer of formula VI has formula VII:

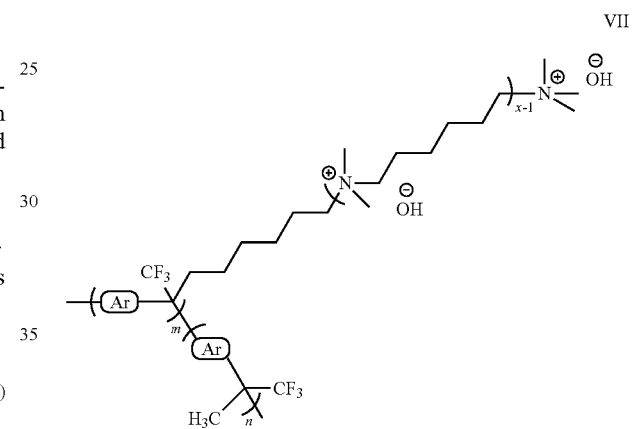

(VII)

In another aspect, a polymer according to formula VIII, is provided:

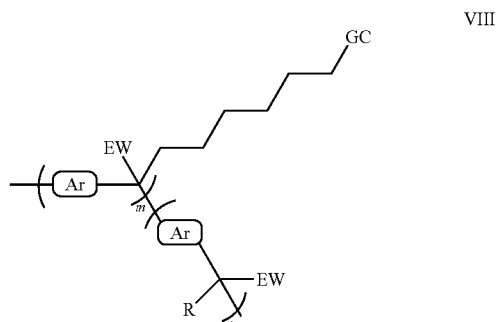

(VIII)

wherein GC is a graft chain comprising multiple ionic moieties;

wherein Ar is an aryl;

R is an alkyl;

EW comprises a moiety selected from the group consisting of an electron-withdrawing group, $CF_3$, a nitrile, an amide, a pyridine, a heterocyclic amine, —C=O, and an amide;

x is from 1 to 20;

n and m are each independently from 100 to 1,000,000.

In some embodiments the multiple ionic moieties include multiple quaternary ammonium groups. In some embodiments EW is $CF_3$. In some embodiments Ar in formula VIII includes:

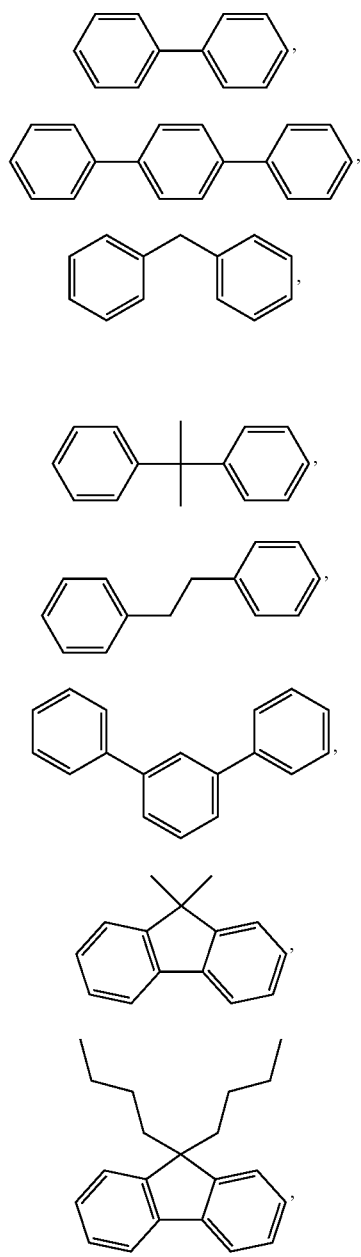

or combinations thereof.

In some embodiments R is an alkyl and EW is $CF_3$.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A polymer according to formula IV:

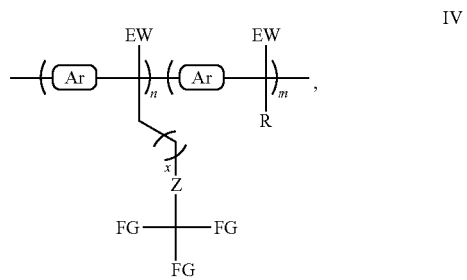

wherein Ar includes:

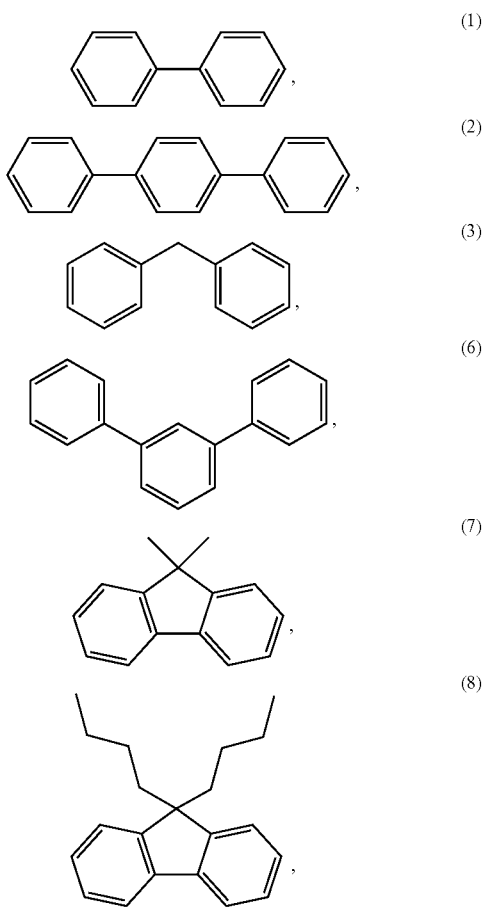

or combinations thereof;

Z is selected from the group consisting of O, S, $CH_2$, and $C_6H_4$;

R is an alkyl;

FG comprises a moiety selected from the group consisting of an alkyl, an aryl, OH, a sulfonate, a phosphonate, and a quaternary ammonium group, wherein at least one FG comprises an ionic moiety;

EW comprises a moiety selected from the group consisting of an electron-withdrawing group, $CF_3$, a nitrile, a pyridine, a heterocyclic amine, —C=O, and an amide;

x is from 1 to 20;

n and m are each independently from 100 to 1,000,000.

2. The polymer of claim 1, wherein the polymer is an anion exchange polymer.

3. The polymer of claim 1, wherein at least one FG comprises a quaternary ammonium group.

4. The polymer of claim 1, wherein at least one FG comprises $(CH_2)_xN^+R_1R_2R_3$, wherein $R_1$, $R_2$, and $R_3$ is each an alkyl.

5. The polymer of claim 4, wherein $R_1$, $R_2$, and $R_3$ are each methyl.

6. The polymer of claim 4, wherein EW is $CF_3$.

7. The polymer of claim 1, wherein the polymer has formula V

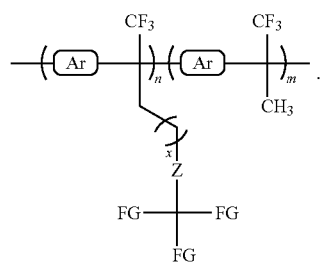

8. The polymer of claim 1, wherein the polymer is a cation exchange polymer.

9. The polymer of claim 1, wherein at least two FGs in a repeating unit comprise an ionic moiety.

10. The polymer of claim 1, wherein at least three FGs in a repeating unit comprise an ionic moiety.

11. A polymer according to formula VIII

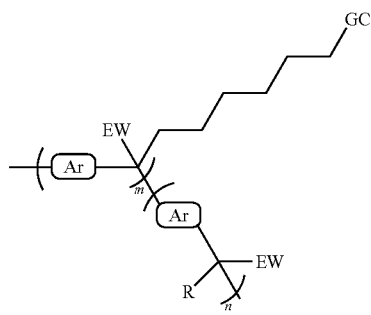

wherein GC is a graft chain comprising multiple ionic moieties;

wherein Ar includes:

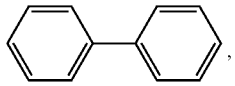
(1),

(2),

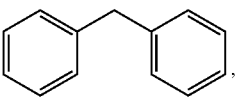
(3),

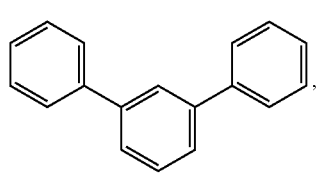
(6),

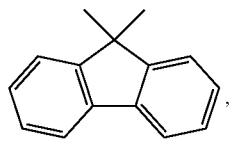
(7),

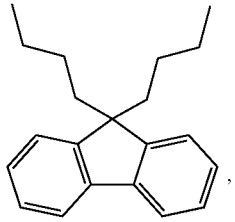
(8), or combinations thereof;

R is an alkyl;

EW comprises a moiety selected from the group consisting of an electron-withdrawing group, $CF_3$, a nitrile, a pyridine, a heterocyclic amine, —C=O, and an amide; and n and m are each independently from 100 to 1,000,000.

12. The polymer of claim 11, wherein the multiple ionic moieties include multiple quaternary ammonium groups.

13. The polymer of claim 11, wherein EW is $CF_3$.

14. The polymer of claim 11, wherein R is an alkyl and EW is $CF_3$.

* * * * *